US010068024B2

(12) United States Patent
Sawhney et al.

(10) Patent No.: US 10,068,024 B2
(45) Date of Patent: *Sep. 4, 2018

(54) METHOD AND APPARATUS FOR CORRELATING AND VIEWING DISPARATE DATA

(71) Applicant: SRI International, Menlo Park, CA (US)

(72) Inventors: Harpreet Singh Sawhney, West Windsor, NJ (US); Jayakrishnan Eledath, Robbinsville, NJ (US); Ajay Divakaran, Monmouth Junction, NJ (US); Mayank Bansal, Sunnyvale, CA (US); Hui Cheng, Bridgewater, NJ (US)

(73) Assignee: SRI International, Menlo Park, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 14/974,871

(22) Filed: Dec. 18, 2015

(65) Prior Publication Data

US 2016/0110433 A1 Apr. 21, 2016

Related U.S. Application Data

(63) Continuation-in-part of application No. 14/718,669, filed on May 21, 2015, now Pat. No. 9,563,623, which is a continuation of application No. 13/484,520, filed on May 31, 2012, now Pat. No. 9,053,194.

(60) Provisional application No. 61/593,662, filed on Feb. 1, 2012, provisional application No. 62/156,425, filed on May 4, 2015.

(51) Int. Cl.
*G06F 17/30* (2006.01)
*G06F 17/27* (2006.01)
*G06F 17/28* (2006.01)
*G06Q 50/26* (2012.01)

(52) U.S. Cl.
CPC .... *G06F 17/30867* (2013.01); *G06F 17/2785* (2013.01); *G06F 17/3087* (2013.01); *G06F 17/2827* (2013.01); *G06Q 50/26* (2013.01)

(58) Field of Classification Search
CPC .................................................. H04N 21/4622
USPC ..................... 707/705, 706; 709/206; 725/46
See application file for complete search history.

(56) References Cited

U.S. PATENT DOCUMENTS

| 5,948,040 | A | 9/1999 | DeLorme et al. |
| 6,842,730 | B1* | 1/2005 | Ejerhed .................. G06F 17/27 704/8 |
| 7,606,579 | B2 | 10/2009 | Thacher |
| 8,312,660 | B1 | 11/2012 | Fujisaki |
| 8,584,388 | B1 | 11/2013 | Fujisaki |
| 8,800,866 | B1 | 8/2014 | Gromley et al. |
| 2007/0011151 | A1* | 1/2007 | Hagar ............... G06F 17/30864 |

(Continued)

*Primary Examiner* — Baoquoc N To
(74) *Attorney, Agent, or Firm* — Moser Taboada

(57) ABSTRACT

Methods and apparatuses of the present invention generally relate to generating actionable data based on multimodal data from unsynchronized data sources. In an exemplary embodiment, the method comprises receiving multimodal data from one or more unsynchronized data sources, extracting concepts from the multimodal data, the concepts comprising at least one of objects, actions, scenes and emotions, indexing the concepts for searchability; and generating actionable data based on the concepts.

20 Claims, 21 Drawing Sheets

(56) References Cited

U.S. PATENT DOCUMENTS

| | | |
|---|---|---|
| 2011/0058028 A1 | 3/2011 | Sakai |
| 2012/0113121 A1* | 5/2012 | Luo .................. G06F 17/30247 345/440 |
| 2012/0114307 A1 | 5/2012 | Yang et al. |
| 2012/0297038 A1 | 11/2012 | Mei et al. |
| 2013/0007063 A1* | 1/2013 | Kalra ................ G06F 17/30893 707/796 |
| 2013/0282699 A1* | 10/2013 | Feng .................. G06F 17/3053 707/722 |

* cited by examiner

METHOD AND APPARATUS FOR CORRELATING AND VIEWING DISPARATE DATA

CROSS-REFERENCE TO RELATED APPLICATIONS

This application is a continuation in part of U.S. patent application Ser. No. 14/718,669 filed on May 21, 2015, which is a continuation of Ser. No. 13/484,520 filed May 31, 2012, which further claims the benefit of U.S. Provisional Patent Application No. 61/593,662 filed Feb. 1, 2012. This application additionally claims the benefit of U.S. Provisional Patent Application No. 62/156,425, filed May 4, 2015. The disclosures of the aforementioned applications are incorporated herein by reference in their entireties.

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field

Embodiments of the present invention generally relate to data correlation systems and, more particularly, to a method and apparatus for correlating and viewing disparate data.

Description of the Related Art

John Naisbitt's famous words often seem truer in today's world than ever before: "We are drowning in information, but starved for knowledge." Increasingly, there are many different, widely available sources of data such as social networks, news sites and newsfeeds, blogs, webcams, and a wide variety of other private and public sources for diverse types of data including photos, videos, and textual content. This creates a growing need for better, more coherent ways to correlate, and to derive semantic information from, the multiple multi-modal sources of information, and to view and navigate all of this data in an organized and meaningful way. Conventional search engines and information retrieval systems, however, are often weak at synthesizing data from multiple sources and channels over multiple modalities that needs to be correlated and "aligned" along multiple dimensions such as geo-space, time, with other entities, events and their semantics.

Current research on cross-modal association tends to rely on an underlying assumption that the different modalities have strongly correlated temporal alignment, which is not always the case. The "Semantic Web" (see www.w3.org/2001/sw) is an example of a technological approach to enable derivation of meaning and associations from web-based content that has been manually semantically "tagged." However, much of the data that is available and continues to be published on the Internet is not semantically tagged at present. Geo-location, for example, can potentially be an important cue in cross-modality association. However, much of the image and video content available on today's Internet may not include location metadata, much less precise geo-location and orientation coordinates, and so it cannot readily be correlated and reasoned about with regard to its geographical location, for example. Broadly speaking, cross-modality association is difficult in part because it entails interpreting signals at a semantic level in order to make correlations, and there remain significant technological challenges in solving the problem of correlating cross-modal data to produce meaningful inferences.

Additionally, existing methods of creating cross-modal associations do not harness the local, timely, "everywhere" nature of open media (social media, including FACEBOOK, TWITTER, INSTAGRAM and the like) to produce intelligence such as prediction, planning and response related to events.

Therefore, there is a need in the art for a method and apparatus for aligning, correlating and viewing disparate and/or unsynchronized data along multiple dimensions (geo-space, time, entities, events and their semantics) in order to produce meaningful inferences and responses to queries, based on cross-modal and multi-modal data streams.

SUMMARY

Embodiments of the present invention relate to an apparatus for collecting data from a plurality of information streams comprising a collection module, a geo-localization module, coupled to the collection module, for geo-localizing the plurality of information streams to identify a geographic location for multiple events extracted from the data, and a correlation module, coupled to the geo-localization module and the collection module, for correlating the plurality of information streams based on the geo-localization and the event and storing correlation data in a database.

Embodiments of the present invention relate to a computer-implemented method comprising collecting data from a plurality of information sources, identifying a geographic location associated with the data and forming a corresponding event according to the geographic location, correlating the data and the event with one or more topics based at least partly on the identified geographic location and storing the correlated data and event and inferring the associated geographic location if the data does not comprise explicit location information, including matching the data against a database of geo-referenced data.

Embodiments of the present invention relate to an apparatus for comprising a collection module for collecting data from a plurality of information sources, a geo-localization module, coupled to the collection module, for identifying a geographic location associated with the data and forming a corresponding event according to the geographic location, a correlation module, coupled to the geo-localization module and the collection module, correlating the data and the event with one or more topics based at least partly on the identified geographic location and storing correlation data in a database and an inferencing module for inferring the associated geographic location if the data does not comprise explicit location information, including matching the data against a database of geo-referenced data.

Further embodiments of the present invention relate to a computer-implemented method comprising collecting data from a plurality of information sources, identifying a geographic location associated with the data for the event and displaying a computer-generated map wherein the data can be accessed via user interaction with the map based on the geographic locations identified respectively for the data.

BRIEF DESCRIPTION OF THE DRAWINGS

So that the manner in which the above recited features of embodiments of the present invention can be understood in detail, a more particular description of the invention, briefly summarized above, may be had by reference to typical embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
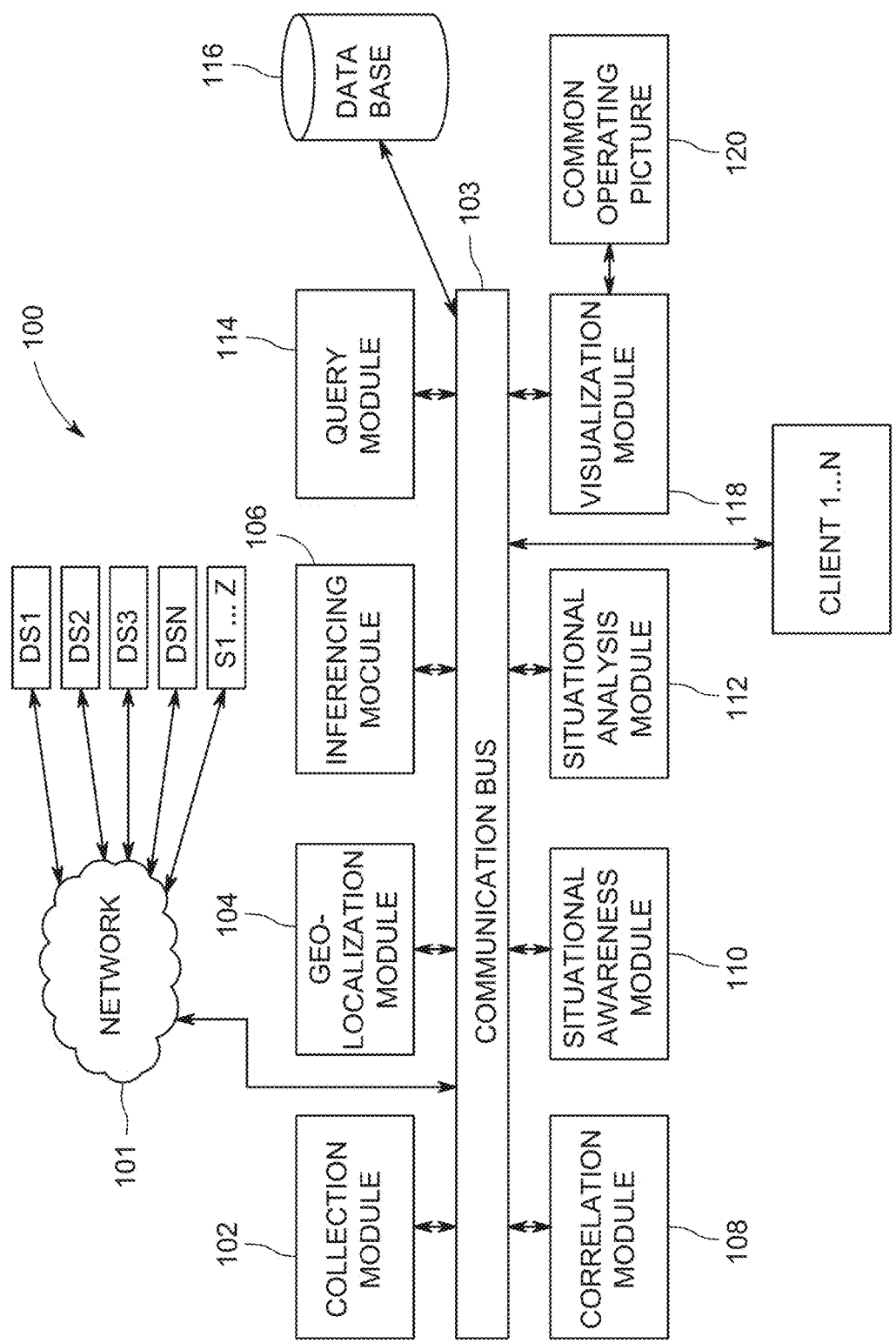
FIG. 1 is a functional diagram of an exemplary embodiment of an apparatus for correlating and viewing disparate data in accordance with at least one of the embodiments of the present invention.

Embodiments of the present invention relate to a method and apparatus for automatically correlating data from disparate and/or unsynchronized data sources (online or offline), which may include software-based or network-based services, hardware devices, ad-hoc sensors and/or planned sensors. Such data sources may be considered to be "independent" of one another, in the sense that they are different devices or services, e.g. different sensors or mobile devices used by different users, content feeds of different social media services, etc. Alternatively or in addition, such data sources may be considered to be "distributed" in that they may be positioned at different geographic locations and connected by a network. Some embodiments include methods for geo-locating the data, in order to facilitate correlating data regarding currently occurring events with respect to particular locations. Various statistical analyses and image processing techniques are utilized in order to extract location specific information and to otherwise correlate the data; in some embodiments, such techniques are also employed to align the data, e.g. to enable predication of future movements and changes within a situation represented by the data. The analyzed and correlated data is presented in a navigable and interactive manner to a user of the system. In some embodiments, a common operating picture (COP) for a current situation of interest is produced, providing situational awareness to a plurality of commanders, analysts, or other cooperating users. For example, a common operating picture may present output that includes selected parts of the disparate and/or unsynchronized data streams, where such selected parts are arranged, compiled or edited in a useful way for the users' particular purposes. In some cases, the common operating picture may include temporally ordered content, for example, images and tweets arranged in a "timeline" to depict time-lapse information about an event. In other instances, the common operating picture may be presented as automatically generated textual, visual, or audio answers or advice by way of a question and answer dialog-style format.

Some embodiments of the present application comprise a method for generating actionable data. The method may comprise receiving multimodal data from one or more unsynchronized data sources, extracting concepts from the multimodal data, the concepts comprising at least one of objects, actions, scenes and emotions, indexing the concepts for searchability and generating actionable data based on the concepts.

The method may further comprise receiving a natural language query, processing the query for semantic information, searching the concepts using the semantic information and formulating a response relevant to the query based on relevant concepts found in the search. The concepts are grouped into groups of related concepts related to particular events, related concepts are aligned within the groups; and an accuracy level of the groups of related concepts is determined based on a level of alignment among the related concepts.

The method may further comprise measuring a trustworthiness of the one or more unsynchronized data sources based on an aggregate accuracy level of the groups of related concepts from each of the one or more unsynchronized data sources. Further, the multimodal data is retrieved as a background process and a trustworthiness of a data source is calculated as an ongoing process. User query data comprises user submitted multimodal data and an accuracy of the user submitted multimodal data can be determined. In some instances, the multimodal data comprises at least background data, local data and uncertain data. The method further comprises determining a locale of a user submitting the user query data and presenting to a user concepts related to a locale of the user. The local data is sourced from traffic cameras, vehicle sensor data and news feeds associated with the locale of the user submitting the user query data. The method predicts upcoming events based on the indexed concepts. In some embodiments, the one or more unsynchronized data sources comprise at least YOUTUBE, TWITTER, FACEBOOK, SMS messages, news feeds, and WAZE.

FIG. 1 is a functional diagram of an exemplary embodiment of an apparatus 100 for correlating and viewing disparate and/or unsynchronized data in accordance with one or more embodiments of the present invention. In an exemplary embodiment, the apparatus 100 comprises an information stream collection module (collection module) 102, a geo-localization module 104, an inferencing module 106, a correlation module 108, a situational awareness module (SAWM) 110, a situational analysis module (SANM) 112, a query module 114, a visualization module 118 and a database 116, all coupled to a central communication bus 103 for inter-module communication. The apparatus 100 can be coupled to the internet via network 101. The network 101 enables the apparatus to be remotely coupled to various data streams produced by a plurality of independent, distributed data sources, which may include computer- or network-based services, ad-hoc sensors (or "sensors in the wild") such as DS1, DS2 . . . DSN. In an exemplary embodiment, the apparatus 100 may also receive data from planned sensors S1 . . . Z, where Z, the number of planned sensors and N, the number of ad-hoc sensors are adjustable based on the needs of particular applications. As used herein, "data source" may refer to any type of device, service, or sensor that is capable of outputting data, including text, audio, and/or visual data. In an exemplary embodiment, the data streams DS1, DS2 DSN comprise online news feeds, Twitter® feeds, Facebook® feeds, data from various social networks, audio/video feeds, and the like. Accordingly, the apparatus 100 is configurable to monitor many diverse feeds, and users of apparatus 100 can add data feeds on a real-time basis.

The collection module 102 is configured to periodically extract data from the various data streams DS1 DSN through the network 101. The collection module 102 works with any type of data stream, can extract entities and events in the stream, and space-time semantic relationships between the events and entities. According to one embodiment, the collection module 102 works in continuous mode and operates on streaming data. The collection module 102 extracts data and stores the data in the database 116 according to configuration parameters of the apparatus 100 such as period of extraction, data stream list, and the like. The geo-localization module 104 analyzes the data in the database 116, and preferably uses a variety of techniques to automatically identify the geographic location of particular scenes and situations that are depicted in or referred to in the data and to form an event based on the geo-localization. For example, for textual content, the system may use keyword and/or semantic analysis of the content to determine relevant location(s). For audio content, voice recognition techniques may first be employed to convert the audio signal to text. For video and other image content, if location metadata is included, then geo-localization module 104 may determine image location from the meta-data in a straightforward manner; otherwise, in some embodiments, module 104 automatically determines locations of images by employing techniques such as analysis and matching of landmarks and other image features against an existing geo-referenced image database (e.g. a satellite image database, Google Earth, etc.) as described in commonly assigned and co-pending U.S. patent application Ser. No. 13/493,654 filed on Jun. 11, 2012 entitled "Method and Apparatus for Inferring the Geographic Location of Captured Scene Depictions" and U.S. provisional patent application Ser. No. 61/495,765, filed on Jun. 10, 2011, entitled "Object Based Geo Localization," each incorporated by reference in its entirety. If extremely precise registration of image content extracted by collection module 102 against reference images is desired, then registration techniques can also be employed, such as those described in U.S. Pat. No. 6,597,818, filed Mar. 9, 2001, which is incorporated by reference in its entirety.

The geo-localization module 104 is coupled to the collection module 104 as well as the correlation module 108 through the communication bus 103. According to an exemplary embodiment, the correlation module 108 is also coupled to the collection module 102 and the database 116. The database 116 stores geographical matching data as well as the correlated data from the various data streams S1 . . . SZ and DS1 . . . DSN. The database 116 is indexed in a way that accessing data is fast and efficient. In exemplary embodiments, the database 116 is indexed categorically, i.e., by keywords, geographic location as determined by the geolocalization module 104 and event and object indexing by the situational analysis module 112, amongst others. Image descriptors and visual features, descriptions and visual features of videos, categorizing tags and the like are stored in the database 116 to facilitate semantic alignment of the multiple media data streams, as described in more detail below, and to facilitate user querying through the query module 114.

The correlation module 108 correlates data from the various information streams in the database 116 with each other. The correlation module 108 can derive correlations from the data itself. In other words, the various data streams processed by the correlation module 108 may be "seemingly uncorrelated," for example one or more of the data streams may not be tagged or otherwise associated with any particular topic, category or label, in advance of the processing performed by the correlation module 108. The types of correlations made by the correlation module may be, for example, entity-based, temporally-based, or based on geolocation. For instance, data streams that are not synchronized temporally may be correlated based on a common or related entity, such as a common visual, textual, or audio element. Similarly, data streams that do not have a common or related entity may be correlated if they overlap in time or geographic location.

In some embodiments, "correlation" may refer to a more general process of associating data streams with one another if they have a same or similar characteristic (e.g., by clustering). In some implementations, correlating may be performed as an initial step in assembling a subset of related data extracted from the various data streams; e.g., data elements associated with a common entity, person, time period, or geographic location. The correlated data may be subsequently aligned by one or more characteristics or attributes of the data. For instance, images and tweets discussing an event may be aligned temporally to show how the event is unfolding or progressing (e.g., traffic jam getting worse or improving), or geo-spatially aligned (showing different views of an event from different viewpoints/locations, or showing an entity (such as a person or car) as it moves to different locations, or semantically aligned (e.g., matching a tweet talking about a car with a picture of a the car mentioned in the tweet).

The correlation module 108 generates groups of correlations and stores these in, for example, relational database tables in database 116 corresponding to the formed events. For example, if a textual news report regarding the formation of a protest is extracted from DS1, video data of the protest is extracted from DS2, and audio clips from analysts discussing the protest and possible spill-over into other locations and the like are extracted from DS3, the correlation module 108 correlates all of these various streams with each other as relating to a particular protest, by semantically analyzing text (including text derived by recognition of audio) and/or imagery to recognize, for example, the overarching theme of a protest and perhaps keywords, names, faces, or other characteristics associated with the particular protest event, along with geo-location data determined by the geo-localization module 104. In other instances, sets of definitions and models describing current events of interest, are manually input to correlation module 108 to determine correlations. The correlation module 108 is coupled to the situational analysis module 112 for analyzing the correlated data by extracting entity classes such as groups of people, vehicles and the like, and reasoning about the extracted entities within a scene (e.g., recognizing what appears to be a group of people chasing someone or surrounding a building, etc.). Additionally, the correlation module 108 couples with the SAWM 110 to determine, based on the extracted entities, possible strategies for addressing the protest from a particular perspective, for example, a law enforcement perspective, or a journalist's perspective.

The extracted entity, event and relationship information (including correlation and situational analysis) is stored in database 116 and clients 1-N can subsequently submit a query through the query module 114 relating to, for example, a particular entity associated with the protest or about the protest itself. In some embodiments, query module 114 accepts simple natural language search term queries such as "protest on Smith St." and the like, and generates a corresponding database query. The visualization module 118 renders a view for users of client 1 . . . N of the correlated data responsive to a user's query. Based on the users selection of output preferences for client 1 . . . N, the visualization module 118 will form the data and only show those entities/events that are responsive to the user's query, or that the correlation module 108 has determined are correlated to events and entities responsive to the user's query, based on a statistical analysis. To use the prior example, if a user is interested in the "Protest on Smith St.," the correlation module also correlates similar protests in other locations, and shows media related to those events through the visualization module 118 to clients 1 . . . N. The correlation module 108, according to this embodiment, performs correlations in real-time based on user's searches. In other embodiments, the correlation module 108 performs correlations passively, i.e., correlates data collected through the collection module 102 and performs the correlations in the background and these correlations are the basis of search results provided to users. In addition, in some embodiments, the SAWM 110 creates a common operating picture (COP) 120, where the COP shows strategic routes and paths, movement of entities within an area, danger zones and the like. The COP assists collaborating analysts in evaluating breaking events by providing them with a consistent, up-to-date picture of a crisis through the visualization module 118.

Figure 3:
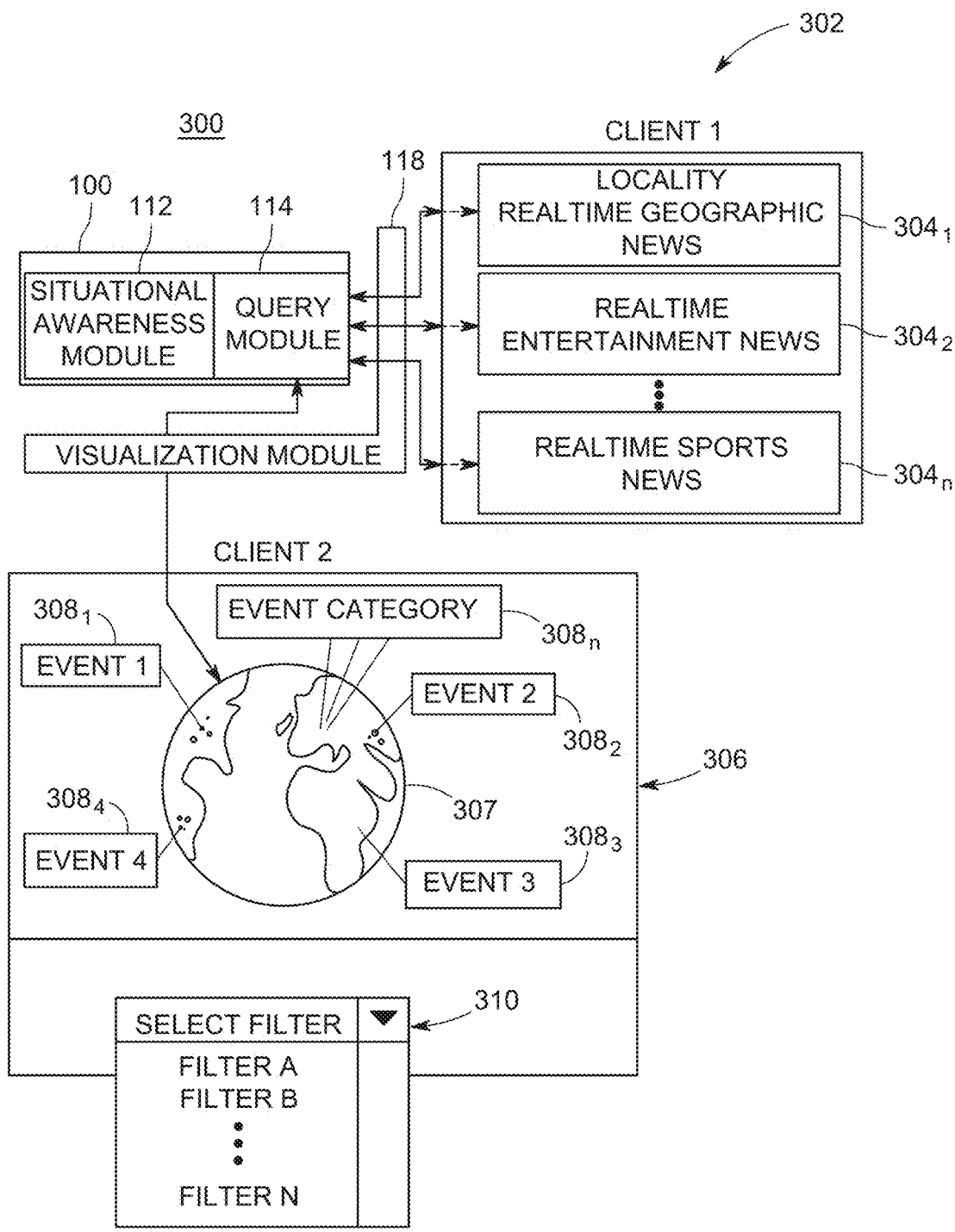
FIG. 3 is an illustration of the output of a visualization module in accordance with at least one embodiment of the present invention.

In exemplary embodiments, the apparatus 100 is a server which accepts query requests through the query module 114 and sends responses of events and analysis based on the received query to various external sources such as search engines, direct clients, downstream information services and the like. In other embodiments, the apparatus 100 hosts an interactive online portal where users can view the data in various ways as shown in FIG. 3 below. The inferencing module 106 is coupled to the database 116 as well as the query module 114 and makes predictions based on recognizing patterns of movement, moods of the crowd, and the like.

Figure 2:
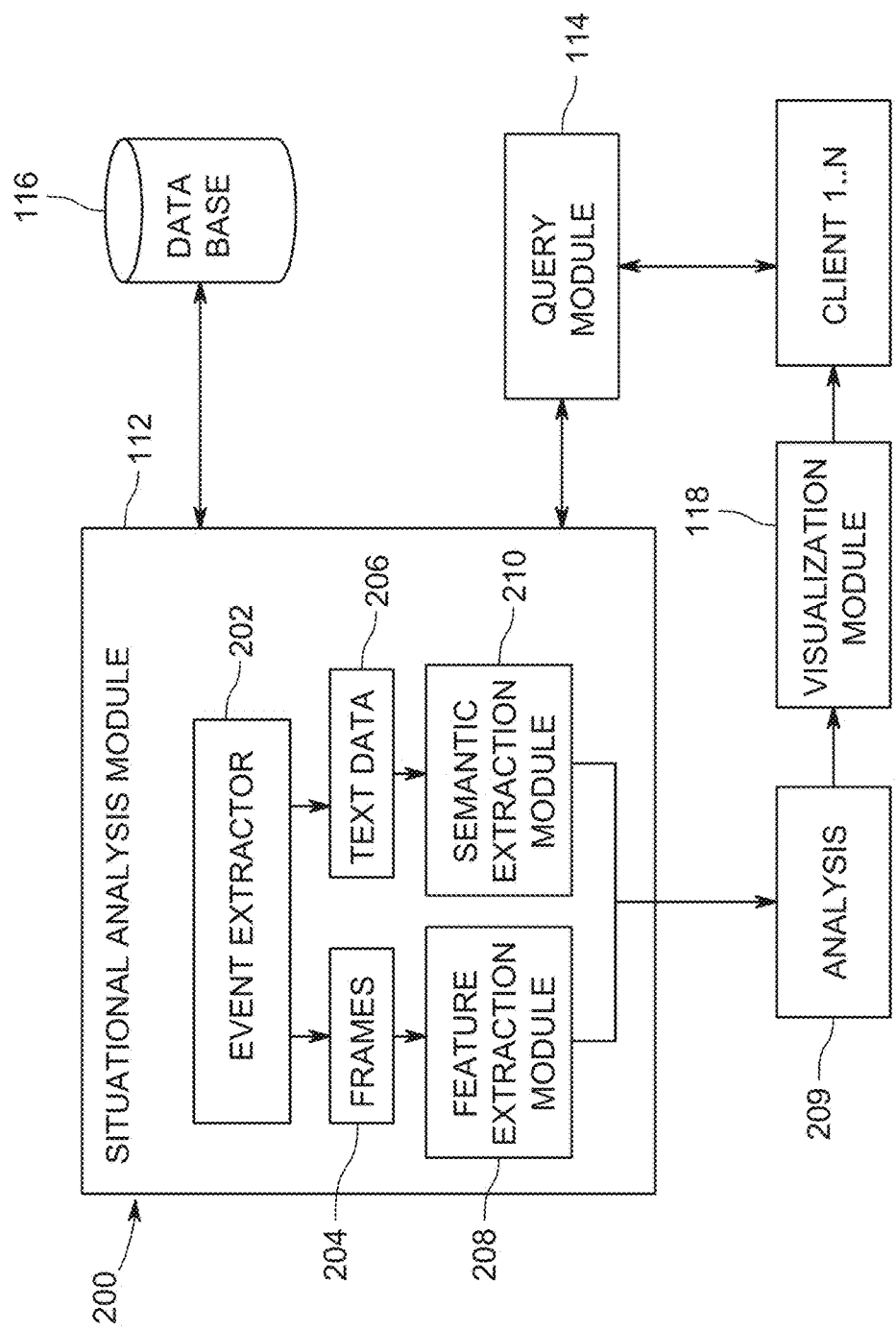
FIG. 2 is a block diagram of the situational analysis module (SANM) in accordance with an exemplary embodiment of the present invention.

FIG. 2 is a block diagram of the situational analysis module (SANM) 112 and its various couplings in apparatus 100 in accordance with an exemplary embodiment of the present invention. The SANM 112 analyzes the correlated data by extracting entity classes such as groups of people, vehicles and the like, and reasoning about the extracted entities within a scene. The SANM 112 comprises an event extractor, and a semantic correlation module 210. The Event Extractor can work with multiple modalities such as text streams, documents, images and videos amongst others to extract textual and image data of interest and their attributes from the events stored in the database 116 by the correlation module 108. Events and their attributes can be extracted from text streams and documents using statistical text analysis and distributional alignment and co-clustering as described in the paper entitled "New Experiments in Distributional Representations of Synonymy," Ninth Conference on Computational Natural Language Learning (CoNLL), Ann Arbor, Mich., (2005) by Dayne Freitag, Matthias Blume, John Byrnes, Edmond Chow, Sadik Kapadia, Richard Rohwer, and Zhiqiang Wang as well as "Simmered Greedy Optimization for Co-clustering," ITNG, Seventh International Conference on Information Technology, Las Vegas, pp. 410-419, (2010) by Sadik Kapadia and Richar Rowher, both herein incorporated by reference in their entirety. The SANM 112 is coupled with the database 116 as well as the query module 114 and the visualization module 118 through communication bus 103 (not shown). SANM 112 performs analysis on the data correlated by the correlation module 108. The SANM 112 couples with the database 116 to retrieve and analyze the data. The event extractor 202 parses the multi-media data and extracts frames 204 of video or images, or descriptions of those frames and textual data 206 highlighting newscasts, TWEETS®, blog and FACEBOOK® posts and the like.

The feature extraction module 208 analyzes frames 204 by algorithmically classifying entities such as moving persons and vehicles into groups for tracking, for example by performing a "history of oriented occurrences" (HO2) algorithm as described in commonly owned pending U.S. patent application Ser. No. 12/489,667, which is incorporated by reference in its entirety herein. In addition to the HO2 or like techniques, event extraction in images and videos can be carried out by computing features related to movement, appearance, shape and semantic entities such as people, vehicles, etc. Furthermore, computing distributions over features and looking for anomalies with respect to known events or statistical trends can discover unknown events of interest.

The semantic extraction module 210 parses the textual data 206 to extract entities based on correlated data from the correlation module 108. The output of the semantic extraction module 210 and the feature extraction module 208 combine to generate a complete analysis 209 related to the clients' 1 . . . N particular query through the query module 114. The visualization module 118 organizes and groups the various data points into a seamless view for simple navigation and easy access to relevant data by the clients $116_1 \ldots n$. Additionally, spatial and temporal gating is used to limit the size of semantic alignment problems associated with the semantic extraction module 210. For example, if a first sensor (not shown in FIG. 2) observed an event, say people running out of a building, and a second sensor (not shown in FIG. 2) observed people running into a building, based on the geo-location of the two sensors and buildings, and the time of the two events, it can be determined whether the two events are correlated. Semantic alignment addresses the issue of where multiple streams from the data streams are related to the same event and need to be aligned semantically.

In other exemplary embodiments, face-name association is performed using statistical matching to present the user with associated text, video and other multimedia about particular popular personalities, as described in the [Nadeu 2007], [Wacholder 1997] and [Berg 2004] papers: [Nadeu 2007]: http://cogprints.org/5859/1/Thesis-David-Nadeau.pdf, [Wacholder 1997]: Nina Wacholder, Yael Ravin, Misook Choi: Disambiguation of Proper Names in Text. ANLP 1997: 202-208; [Berg 2004]: Names and Faces in the News, Tamara L. Berg, Alexander C. Berg, Jaety Edwards, Michael Maire, Ryan White, Yee Whye Teh, Erik Learned-Miller, David A. Forsyth *Computer Vision and Pattern Recognition* (*CVPR*), 2004.

FIG. 3 is an illustration of the output of the visualization module 118 in accordance with at least one embodiment of the present invention. Client window 302 represents a client's view when using a web-browser to access services offered by the apparatus 100. In other embodiments, client 302 may be a thick client or a thin client accessing web services published by the apparatus 100. Several different types of clients can simultaneously access the services of apparatus 100. A user accesses the services of apparatus 100 through client window 302, by submitting a search term or the like to the query module 114. The query module 114 couples to the database 116 through the communication bus 103 to generate a real-time or near real-time list of events related to the input query as they occur and as data for such events is publicly posted in online data sources. In an exemplary embodiment, the view is divided into several sections of news, where group $304_1$ shows real-time local geographic news, $304_2$ shows real-time entertainment news and group $304_n$ showing real-time sports news. These groups $304_1 \ldots n$ are populated according to the user's query. Additionally, the client window 302 can show related relevant items and predictions inferred by inferencing module 106 of the apparatus 100. The groups $304_1 \ldots n$ are being continually updated by the SANM 112, which is constantly monitoring database changes for new information streams based on the user's interests. The SANM 112 may also be driven by system level criteria in some embodiments such as preconfigured settings for particular topics, events, locations or the like, according to the preference of a user or organization.

Client window 306 is also accessible remotely through a web-browser window or on a thick client display via execution of a desktop application, and the like. Client window 306 displays an Earth model 307, manipulable by a client cursor to display differing sections of the globe. A user may select a presentation filter using drop-down box 310. In exemplary embodiments, filters can be entities such as individuals or cars, objects, specific events and the like. Further, the model 307 is shown according to a modality selected by the user. The user may also select a different modality such as a conceptual modality showing groupings of concepts, a breaking-news modality or a climate modality each of which may be represented as a different graphical user interface. A user may view all related media for a particular filter and the global view 307 displays various event labels such as $308_1$ to $308_4$. The user may select a particular event label to read a story and watch associated videos and an analysis of a particular event, enter a new query term to repopulate the global view with new labels, or rotate the globe view as new relevant stories are correlated by apparatus 100 and updated to the view by the visualization module 118.

In an exemplary embodiment, the apparatus 100 makes predictions based on the existing data in database 116 and, while the correlation module 108 is correlating data, statistical interpretation is performed by the SAWM 110 (as described below) and the situational assistant 111 assists those in need of "on the ground" knowledge, exit strategies, paths, and the like.

In some embodiments, client windows 302 and 306 present an organized view of events selectively chosen for their particular relevancy to not only the user's query, but an individual long-term profile of the user indicating e.g. locations, categories, and people of interest to that user. Such a profile can be created by soliciting explicit user input (e.g. by questionnaire), and/or can be inferred by system 100 by employing machine learning algorithms with respect to the interactive viewing selections made over time by various users. A meaningful organization of images and videos is presented to the user, where the images and videos are a subset of relevant data items that are also viewable on user, as opposed to all relevant data available in the database 116. The user may also place the views into static mode that does not update in real-time, or customize the updating of the information streams to only update with a particular frequency. Alternatively, the user may view all event data to synthesize responsive data in a visually coherent way, for example, by integrating time-sequenced, geo-located images and text with a map of the location of interest for important events and the like for future querying, or just as a worldwide event viewer.

Figure 4:
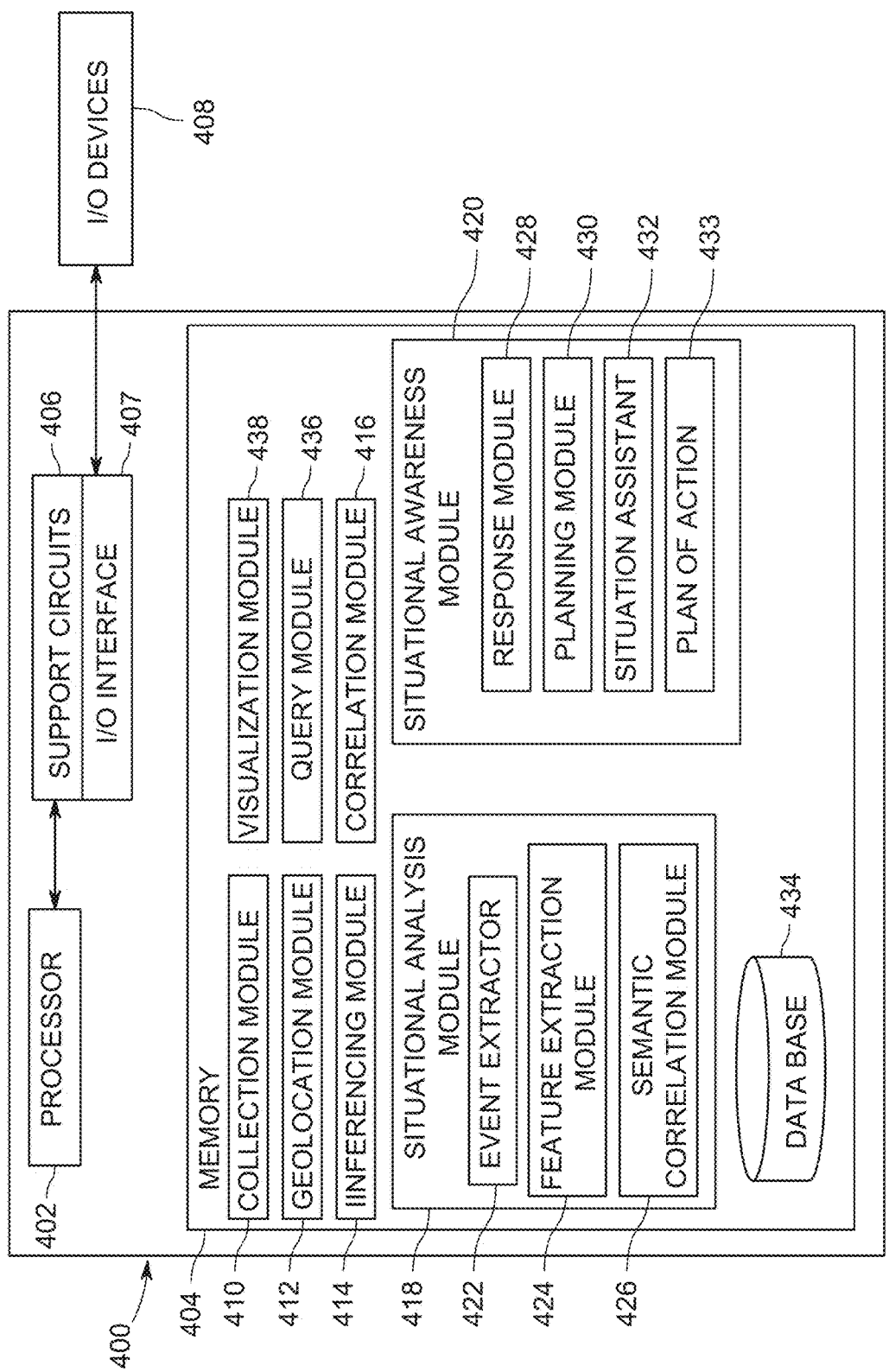
FIG. 4 is a block diagram depicting an exemplary embodiment of a computer system in accordance with one or more aspects of the invention.

FIG. 4 is a block diagram depicting an exemplary embodiment of a computer system 400 in accordance with one or more aspects of the invention. The computer system 400 represents one embodiment of a system used to implement the apparatus 100. The computer system 400 includes one or more computing devices, including a processor 402, a memory 404 and various support circuits 406. The processor 402 may include one or more microprocessors known in the art, and/or dedicated function processors such as field programmable gate arrays programmed to perform dedicated processing functions. The support circuits 406 for the processor 402 include microcontrollers, application specific integrated circuits (ASIC), cache, power supplies, clock circuits, data registers, I/O interface 407, and the like. The I/O interface 407 may be directly coupled to the memory 404 or coupled through the supporting circuits 406. The I/O interface 407 may also be configured for communication with input devices and/or output devices 408, such as, network devices, various storage devices, mouse, keyboard, displays, sensors and the like.

The memory 404 stores non-transient processor-executable instructions and/or data that may be executed by and/or used by the processor 402. These processor-executable instructions may comprise firmware, software, and the like, or some combination thereof. Modules having processor-executable instructions that are stored in the memory 404 comprise a collection module 410, a geo-localization module 412, an inferencing module 412, a correlation module 416, a situational awareness module 420, a situational analysis module 418, a query module 436 and a visualization module 438. The situation analysis module 418 further comprises an event extractor 422, a feature extraction module 424 and a semantic extraction module 426. The situational awareness module 420 comprises a planning module 428, a response module 430 and a situation assistant 432 for generating a plan of action 433. In an exemplary embodiment, the memory 404 may include one or more of the following: random access memory, read only memory, magneto-resistive read/write memory, optical read/write memory, cache memory, magnetic read/write memory, and the like, as well as signal-bearing media as described below.

Figure 5:
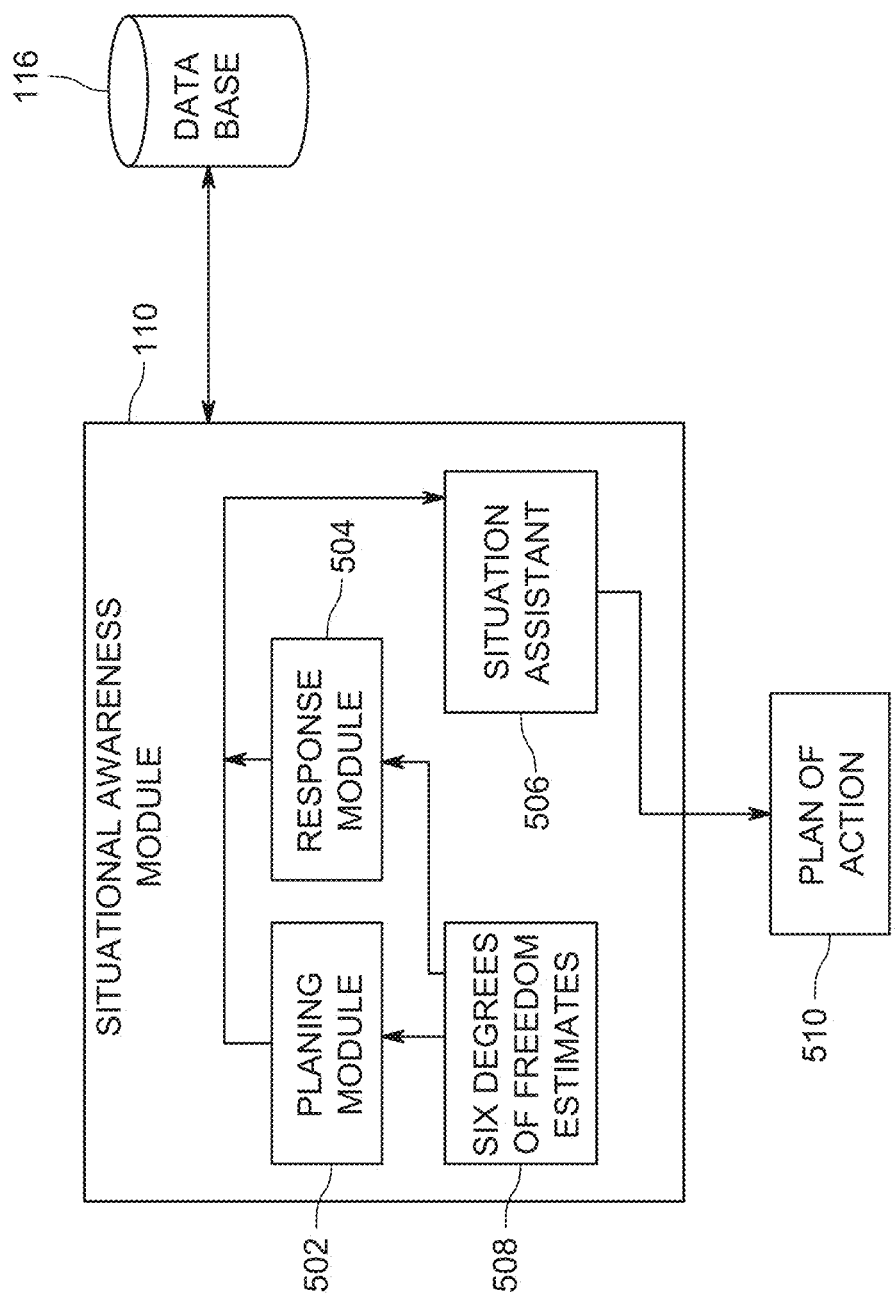
FIG. 5 is a block diagram of a situational awareness module in accordance with one or more aspects of the invention.

FIG. 5 is a block diagram of the situational awareness module 110 with its various couplings in apparatus 100 in accordance with one or more aspects of the invention. The SAWM 110 comprises a planning module 502, a response module 504, and a situation assistant 506. The SAWM 110 is coupled with the database 116 to retrieve correlated objects, events and locations. The planning module 502 uses six degrees of freedom (6DOF) estimates to plan exit strategies and exit routes, as described in commonly assigned pending U.S. patent application Ser. No. 13/217,014, which is hereby incorporated by reference in its entirety. The response module 504 uses the 6DOF estimates to plan coordinated responses to situations that may be possibly dangerous. The situation assistant 506 evaluates the planning and responses and develops a plan of action 510 for personnel involved in the situation or event being analyzed to follow and execute.

Figure 6:
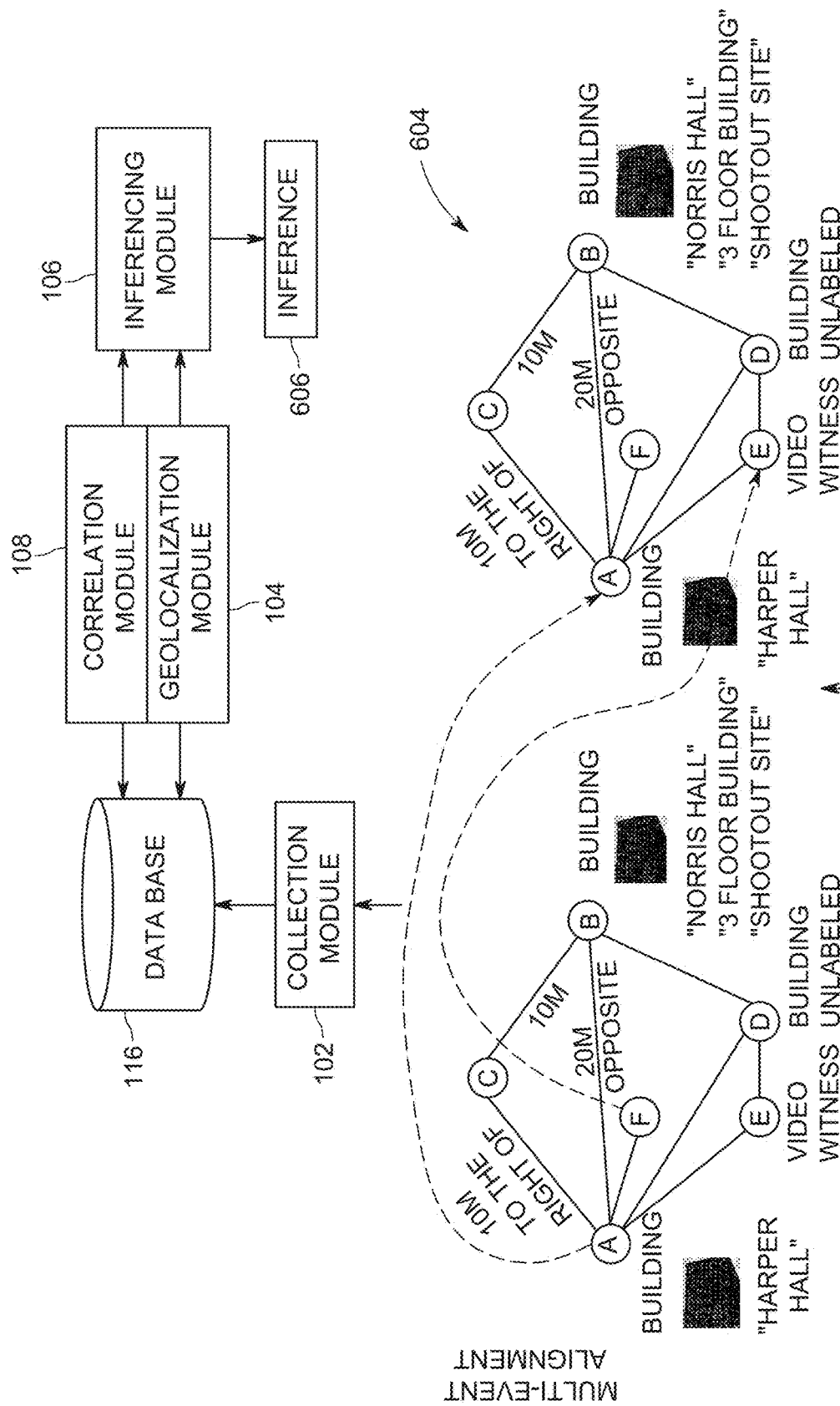
FIG. 6 is a functional block diagram showing an example of generating an inference through an inferencing module.

FIG. 6 is a functional block diagram showing an example of generating an inference through inferencing module 106. Sensors in the wild 602 along with planned sensors, such as aerial cameras and the like, capture videos and images of objects and things such as people and locations, collectively referred to as entities 604. In this example, image, audio, and/or other sensory data captured by sensors 602 is augmented with related information about each entity, such as the names of buildings, the distances between them, actors and their paths, and location information. According to one embodiment, the augmentation is accomplished by transmitting a request to a geographical information system (GIS) web service database with road network and urban infrastructure data. The entities 604 and the related data for each are collected by the collection module 102 and stored in the database 116. As needed, geolocalization module 104 locates the entity in a particular location and the correlation module 108 correlates the various different types of data streams involving the entities. The inferencing module 106 draws one or more inferences 606 based on scene data gathered by sensors 602. For example, analysis of video frames captured by one or more of sensors 602 could result in recognition of events including: (a) at 7:46 AM, a car rapidly gained speed and departed the area of $30^{th}$ St. Station, (b) at 7:47 AM, an explosion occurred on Track 6 of $30^{th}$ St Station, (c) at 7:48 AM, crowds of people ran towards Exits 2 and 3, and (d) a stampede was observed at 7:50 AM". Higher-level, explanatory inferences drawn by module 106 may include that the explosion was the reason for the running crowd and the resulting stampede, and may include a hypothesis that the speeding car was driven by perpetrators of the explosion. Inferences will be derived using representation of entities, events and their relationships including locations, time, etc., with graphical models. Graphical models enable representation of complex events and interactions using local dependencies. Inferencing with graphical models is used to derive statistical distributions for the represented entities, events and their relationships.

Figure 7:
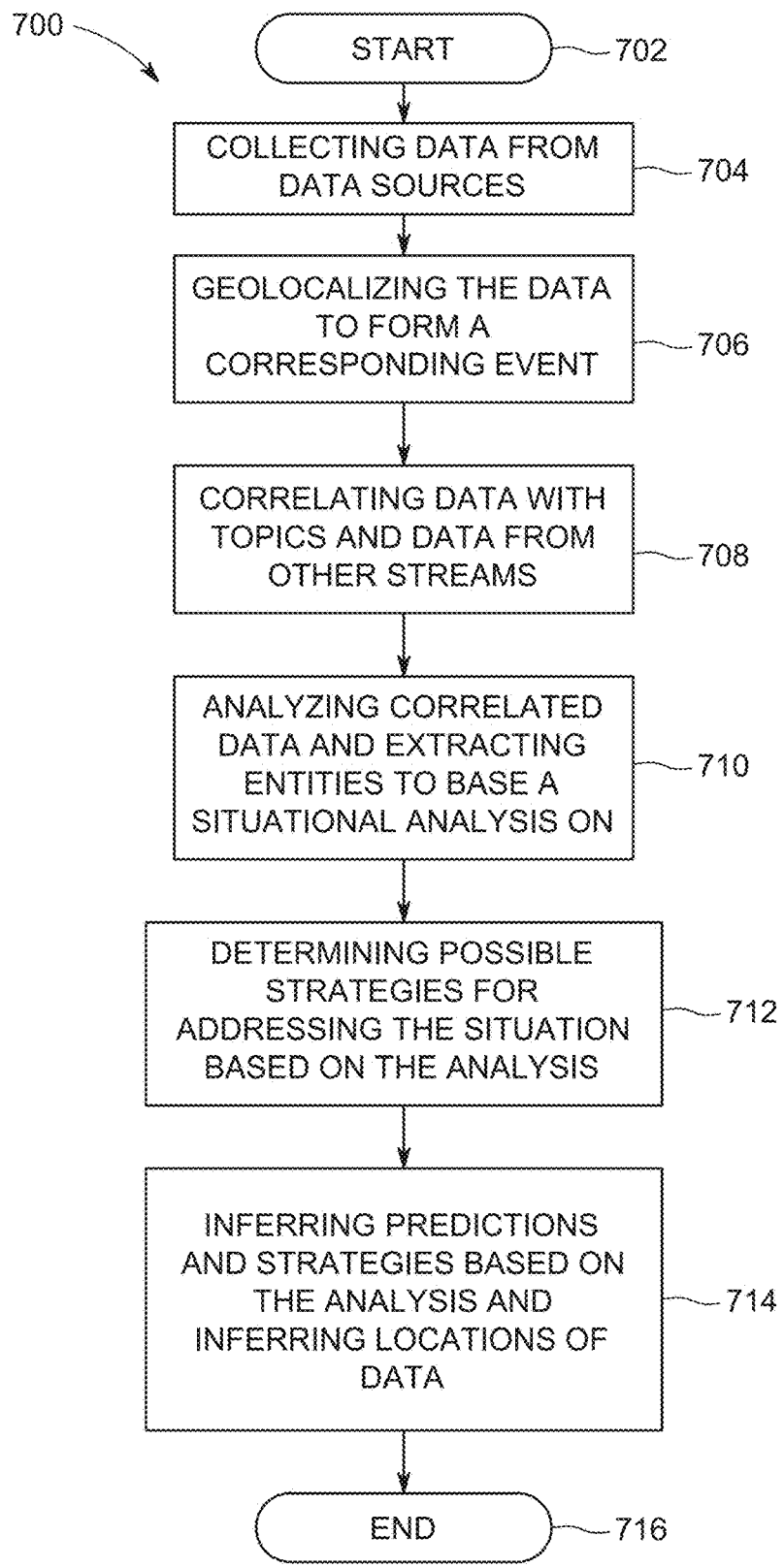
FIG. 7 is a flow diagram for a method for correlating disparate data in accordance with at least one embodiment of the present invention.

FIG. 7 is a flow diagram for a method 700 for correlating disparate data in accordance with at least one embodiment of the present invention. The method 700 is an implementation of the operation of apparatus 100 in FIG. 1, stored in memory 404 of the computer 400 and executed by the processor 402. The method begins at step 702 and proceeds to step 704 where data is collected from online data sources or sensors, including "Sensors in the wild" (ad-hoc sensors) shown in FIG. 1 $DS_{1 \ldots N}$ as well as planned sensors $S_{1 \ldots z}$. Step 704 is performed by the collection module 102, where in one embodiment the collection module includes one or more web-crawlers searching online data sources such as news feeds, Twitter® feeds, Facebook® posts and the like. Such crawling may be performed, in some embodiments, at periodic intervals according to a base metric determined by a configuration of the apparatus 100. The online data sources may be publicly available, and in some embodiments one or more of the data sources may comprise personal or private sources available only to an individual user or to a select group of users.

At step 706, the geo-localization module 104 identifies the location of ("localizes") the data collected from the sensors and encodes these locations in searchable tags associated with the corresponding items of localized data. If location information is explicitly provided (e.g. as metadata) for a given item of data, then localizing such data is straightforward. When such metadata is not provided, then module 104 seeks to infer location using one or more applicable automated techniques. For example, textual content is parsed for any locations mentioned; the IP address of a live feed can be examined to establish a presumed or estimated geographic location of the data collected from that source; video and other image content can be analyzed using feature matching techniques with respect to a known geo-referenced image database. For example, given an area-of-interest such as a neighborhood or city, a feature database is created using both satellite (SAT) and oblique bird's eye-view (BEV) imagery covering the area. The SAT and BEV data are fully geo-referenced and, according to an exemplary embodiment, are received through satellite communications. SAT provides orthographic top-down views of the scene while BEV provides oblique viewpoints. By combining the two, building outlines as well as building facades can be extracted. SAT images provide the outlines while one or more of the BEV images are used to locate the corresponding buildings and extract facades. Features are computed that capture the statistical self-similarity (or dissimilarity) of local patches on a building facade with respect to other patches on the facade. Since these features essentially capture the local appearance statistics, they are robust to viewpoint and global appearance changes and can be computed in a similar manner for street view images collected from the sensors shown in FIG. 1 as well and then robustly matched with the features stored in the feature database. The location of the street view image can thus be determined from the known location of the matching, geo-referenced satellite data. For further information, refer to U.S. Pat. No. 8,989,483 ("Geo-localization of street views with aerial image databases").

Once each feed is geo-localized, the results are stored in the database 116. The method then moves to step 708 where the textual, graphical, audio, video and other data items are correlated with each other based on the geographic location identified at step 706 and based on other information (tags descriptors, subject matter, topics, etc.). The correlations are also stored in database 116. The method 700 uses the situational analysis module 112 to analyze the correlated data and extract entities to base a situational analysis on in step 710. The entities may comprise, for example, traffic patterns, road blocks, famous personalities who have tweeted they are in the area, breaking news nearby, places of interest and the like. For example, if a user searches for "Times Square," the SANM 112 may generate information about shopping stores, restaurants and the like. A user may also filter the search query for more precise information about Times Square. At step 712, the situational awareness module 110 determines possible strategies for addressing the situational based on the situational analysis performed by the SANM 112, such as exit strategies, suggested tactical maneuvers, efficient routes for shopping and the like.

At step 714, the inferencing module 106 infers predictions based on the situational analysis and possible strategies and infers the location of data where location information was not initially available. The inferencing module 106 may also use the correlated data and situational analysis to statistically determine predictive attributes of a situation developing at a sporting event or shopper's moods during a holiday and predicting where the best sales are or where people are focusing their attention. The method ends at step 716.

Figure 8:
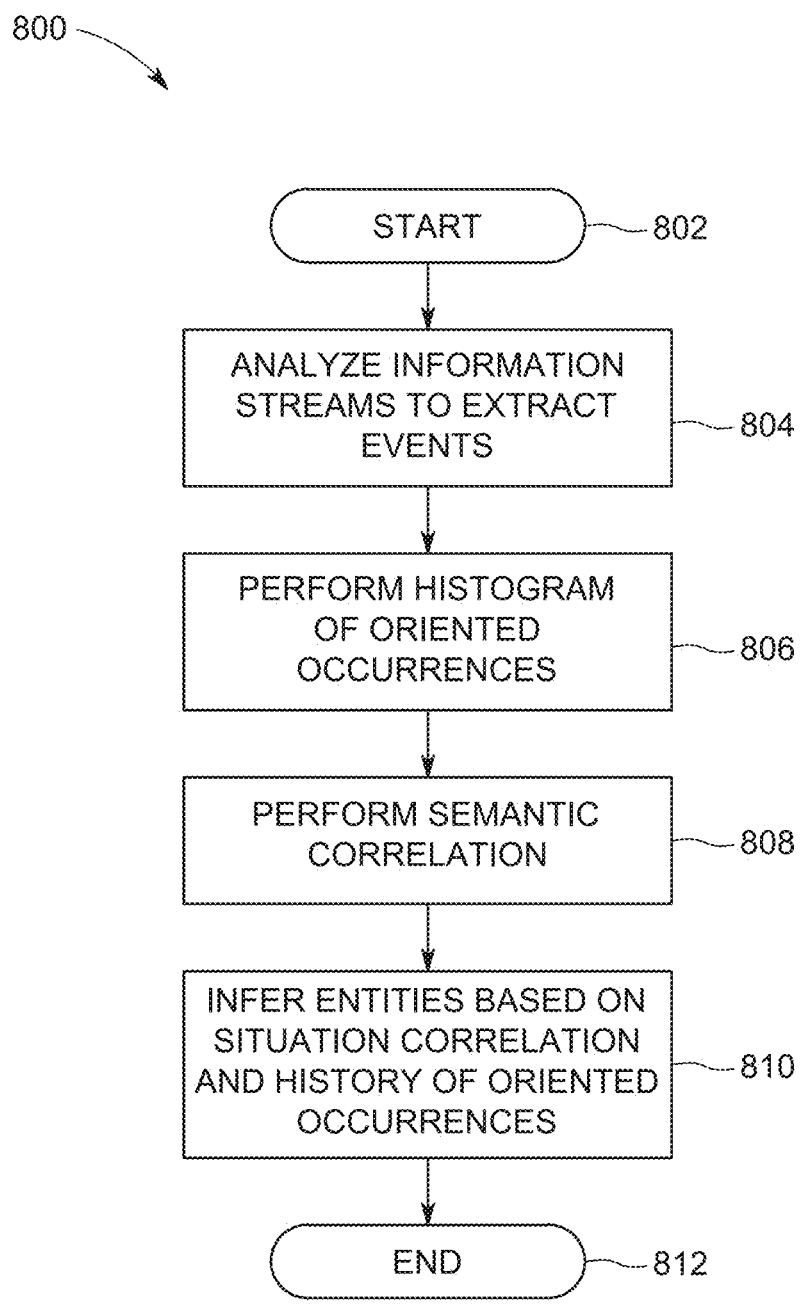
FIG. 8 is a flow diagram for a method for extracting events in accordance with at least one embodiment of the present invention.

FIG. 8 is a flow diagram for a method 800 for extracting events in accordance with at least one embodiment of the present invention. The method 800 is an implementation of the operation of situational analysis module 112 in FIG. 1 stored in memory 404 of the computer 400 and executed by the processor 402. The method 800 begins at step 802 and proceeds to step 804 where the information streams from S1 . . . Z and DS1 . . . DSN are analyzed to extract events performed by the SANM 112. The SANM retrieves data from database 116 and uses the event extractor 202 to extract video frames 204 and textual data 206. At step 806 of the method, the feature extraction module 208 performs a histogram of oriented occurrences of the video frames to establish entity classes and to track movement in those classes and actions taken by members of the classes, as described in pending U.S. patent application Ser. No. 12/489,667. At step 808, the semantic correlation module 210 performs event extraction, including semantic correlation of extracted events for concept detection, as described in U.S. Patent Application Publication No. 2013/0282747 of SRI International, herein incorporated by reference in its entirety. At step 810, the entities are inferred based on correlation followed by entity extraction, using HO2 or other suitable algorithmic techniques. The method ends at step 812.

Figure 9:
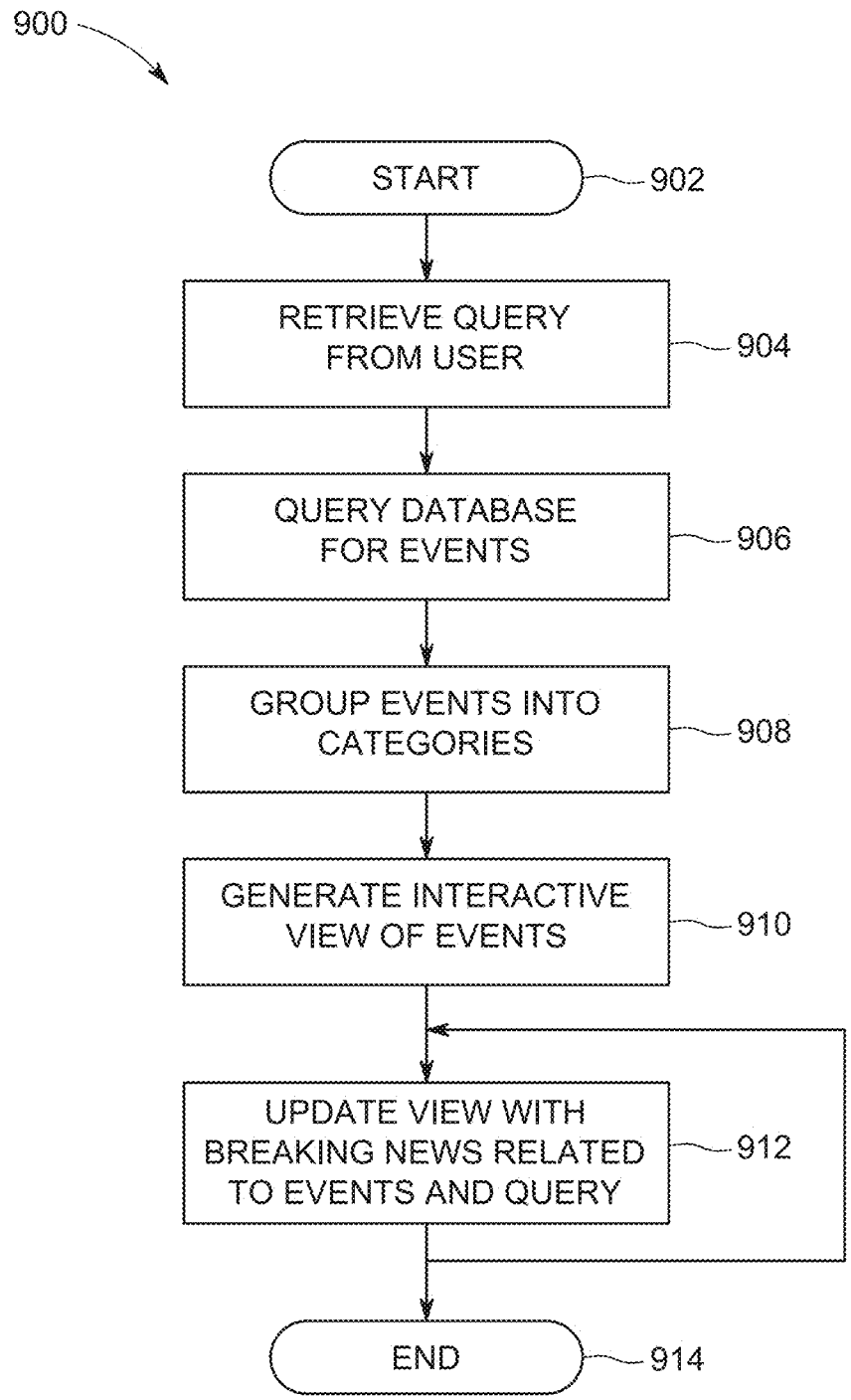
FIG. 9 is a flow diagram for a method for displaying related events to a user in accordance with at least one embodiment of the present invention.

FIG. 9 is a flow diagram for a method 900 for displaying related events to a user in accordance with at least one embodiment of the present invention. The method 900 is an implementation of the operation of visualization module 118 of FIG. 1 stored in memory 404 of the computer 400 and executed by the processor 402. The method begins at step 902 and proceeds to step 904 where the query module 114 of FIG. 1 receives a query from a user such as a search term. The query is parsed and run against the database 116 at step 906 to search for events that are associated in database 116 with a searchable term, tag, descriptor or the like that matches the parsed query. The visualization module 118 groups retrieved events into categories at step 908 based on the correlated data from the correlation module 108. At step 910, an interactive view of the categories of events is presented to the user, where a user may manipulate the view and change the modality of the view, i.e., to a view of people of interest, or locations of interest. At step 912, the view is updated periodically with breaking feeds relating to the entered query, until the user closes the viewer, ending the method at step 914.

The invention described above may be used in various exemplary embodiments to provide multimodal understanding of unsynchronized and/or disparate information available through public and private sources of data. The unsynchronized and/or disparate information can be aligned and correlated in order to provide searchable local logistical data, to learn about developing news and to obtain a broader understanding of events and their development. Additionally, the various exemplary embodiments can determine the accuracy of events reported from multiple sources as well as extract emotions and actions associated with multi-modal media. The various exemplary embodiments can provide the disclosed multi-modal understanding features on-demand, e.g., in response to an implicit or explicit user request or query, or pre-emptively, e.g., triggered by some event or condition other than a user request, including, for example, the discovery of a correlation by the system. These embodiments are described below.

Figure 10:
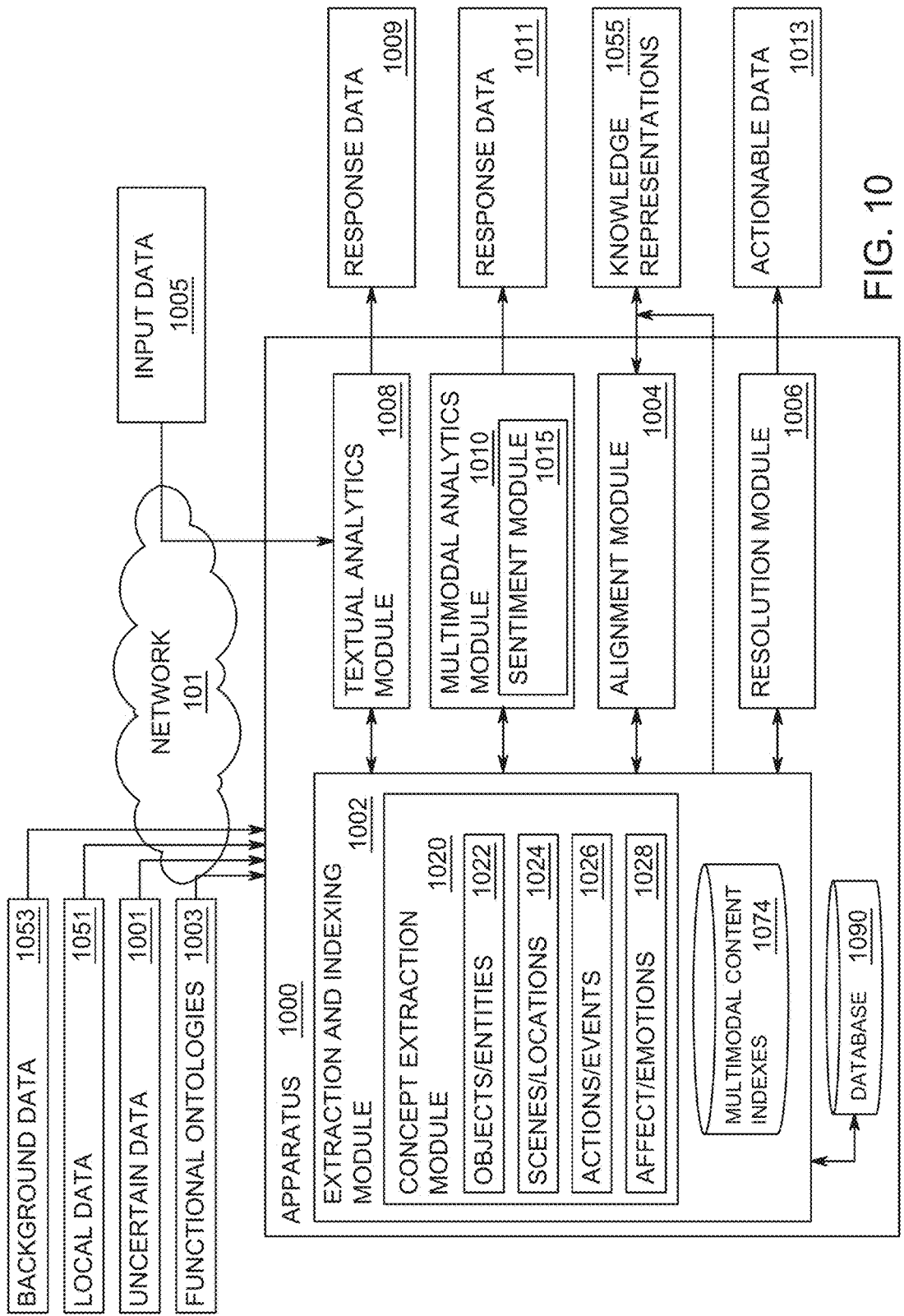
FIG. 10 is a functional diagram of an exemplary embodiment of an apparatus for providing multimodal understanding in accordance with one or more embodiments of the present invention.

FIG. 10 is a functional diagram of an exemplary embodiment of an apparatus 1000 for providing multimodal understanding of information within real-time data in accordance with one or more embodiments of the present invention. The apparatus 1000 is an alternative embodiment and enhancement of the apparatus 100 shown in FIG. 1. The apparatus 1000 clusters real-time data contained in open multi-media sources to enable consumer and businesses to obtain in-time, actionable information, textual topic discovery, vector representation of language semantics and embedding between language and visual representations based on computational reasoning. "Actionable information" may include information that facilitates a user's decision making process or provides other informational assistance, and may include suggestions and/or notifications, such as suggested alternative routes to avoid a situation or notifications of an event that may interfere with the user's plans in some way, such as a planned route of travel, calendar event or task in a task list. Actionable information may assist a user in adjusting his or her plans or re-planning, in response to a detected situation, such as an event relating to a physical environment (e.g., traffic jam, weather event, accident, long line/wait, etc.). In some embodiments, the apparatus 1000 may render news and information.

For example, structured content about current events can be rendered or constructed from heterogeneous data streams. Information is combined from different sources to generate new (e.g., summarized) news articles. In some instances, those news articles may be personalized for each user based on the user's specific interests, which may be automatically determined, manually input, or based on a combination of automatically determined preferences and manual input.

In another embodiment, the apparatus 1000 is used as a question and answer system where those in distress access the apparatus via a mobile interface, a web interface, a telephone interface or the like. The closest exit point not on fire in a building can be determined, or a road leading out of a particular neighborhood can be mapped and provided to the user. Additionally, the apparatus 1000 can, based on temporal alignment of data streams, spot trends in particular topics, such as clothing, tourism, dining or the like. For instance, the apparatus 1000 can temporally align multimodal data (such as photos, comments, user ratings, etc.) relating to particular product brands, hotels, restaurants or retailers to discover whether a particular item's popularity is increasing or decreasing over a period of time.

In some instances, the apparatus 1000 is embodied as a remote service accessible via a cloud application by a mobile application that provides real-time traffic information to a driver of a vehicle, and may be integrated with other traffic applications such as WAZE or GOOGLE MAPS. In some instances, the WAZE application uses the data generated by the apparatus 1000 as a new data source to update the mobile application.

In an exemplary embodiment, the apparatus 1000 comprises an extraction and indexing module 1002, an alignment module 1004, a resolution module 1006, a textual analytics module 1008 and a multimodal analytics module 1010. The extraction and indexing module 1002 further comprises a concept extraction module 1020 and multimodal content indexes 1074. The extraction and indexing module 1002 is coupled to the textual analytics module 1008, the multimodal analytics module 1010, the alignment module 1004 and the resolution module 1006. Each of the aforementioned modules interacts with, retrieves data from, and stores data to the multimodal content indexes 1074 of the extraction and indexing module 1002.

The apparatus 1000 receives various data and stores the data in a database of information such as database 1090. In some embodiments, this data includes background data 1053, local data 1051, uncertain data 1001 and functional ontologies 1003. These data sources are exemplary embodiments of the data sources DS1 to DSN shown in FIG. 1. The apparatus 1000 extracts concepts from the multimodal data, indexes the concepts, and analyzes these concepts to determine correlations within the data and to produce a multimodal understanding of the events that the multimodal data represents. Further, the apparatus 1000 produces inferences based on the multimodal data that aids in determining responses to events such as response data 1009 and response data 1011, knowledge representation 1055 and actionable data 1013. In some embodiments, inferencing is performed on graphs of interconnected data exploiting graph sparsity with fast k nearest-neighbor traversals. Graphs can be used to represent and manage very large scale data. For instance, such data can be represented as a graph of entities, events, their attributes and relationships. Although such a graph may represent such data relationships over large-sized geographic regions (such as countries), with billions of entities, thousands of events and millions of attributes and relationships, this type of graph tends to be sparse, since the data relationships tend to be local. As mentioned above, indexing can be used on sparse graphs to efficiently compute similarity clusters that associate multimodal data with other multimodal data that may have semantic significance and correlation. To derive a semantic understanding of events from large scale multimodal data, we perform computations on sparse graphs and use a gating technique to limit or contain the scope of inference and computation (e.g., clustering) performed with such graphs.

Gating of large graphs can be done using any of the attributes and entities that the graph captures, including spatial, temporal, and/or semantic attributes and/or entities. For instance, knowledge of a current event, such as the beginning of civil unrest in Baltimore, can be used by spatio-temporal gating to limit the scope of graph computation and inference on nodes and relationships that are bound by the spatio-temporal volume corresponding to the geographical extent of Baltimore and the time extent of the events of interest.

Similarly, an example of gating by semantic entity might, for example, utilize a tweet mentioning " . . . a tank on Main Street" to limit the scope of computation and inference to nodes and edges that correspond to Main Street and vehicles, and maybe even further by military vehicles as discerned from text, photos and videos. Stated another way, gating can be used to exclude from the computation and inferencing those portions of the graph that fall outside the scope of the gating criteria. Any combination of spatial, temporal, and/or semantic criteria can be used for the gating.

Indexing provides a principled mechanism for implementing space-time-semantic gating. Indexes related to space and time easily provide means for gating and filtering those observations that fall, accounting for uncertainty, within the scope of the space-time-semantic extent that is provided.

In semantic gating, semantics of entities and events may include textual, audio, visual, or a combination of textual, audio and/or visual features or descriptors. For example, both linguistic descriptors as words and phrases and exemplars from the photos and videos that are captured in a system can serve as gating criteria. For instance, an SUV that looks like "THIS" (a visual depiction of the SUV) could be used to gate the underlying graph with entities related to SUVs and also using the computed appearance indexes. In this process of semantic gating, we account for semantic and exemplar similarity, not just sameness. Whereas "sameness" indicates that two items of content are identical or substantially identical (i.e., two pictures that depict the same car), "similarity" refers to items that are associated with the same class or category of items (e.g., two pictures of different types of pickup trucks). In order to realize the notion of similarity across linguistic and multimodal semantics, we employ the notion of embedding of concepts jointly in a space that can represent both linguistic as well as audio-visual and other concepts.

The embedding space is typically a high-dimensional space in which locations and regions represent specific semantic notions, even the ones that may not be directly expressible in terms of words and phrases. For instance, grass, fields, pastures are linguistic concepts that will occupy contiguous regions in the high dimensional embedding space. In addition, color-texture-shape appearances represented by typical grassy fields and pastures depicted in images and videos would also occupy close regions although the rich appearance of the color-texture-shape features may not be exactly describable with simple words and phrases. As a result, when indexing and gating with words, phrases and/or exemplar audio-visual objects, nearest neighbor search and gating is easily facilitated in the embedding space since this space represents a continuum of discrete as well as continuous concepts no matter which modality is used to learn the concepts. The end result of this is that clusters produced by the system can include data that is semantically, spatially, and/or temporally related, across multiple different modalities. That is, a particular cluster can include a mixture of text, audio, video and still image data. Also, while the multimodal data set and resulting graph may be very large, the system can utilize the gating and indexing techniques described above to quickly focus on an area of interest (e.g., in response to current context data or a query).

In one embodiment, background data 1053 refers to data collected by the apparatus 1000 from news sources, websites, social media sites, TWITTER feeds, INSTAGRAM pages, real-time video, mobile apps such as WAZE, vehicle sensors, traffic cameras, or the like. Local data 1051 is also collected from some of these sources, but includes data that is local to a particular user or area. For example, if a user has designated that their local area is New York, N.Y., local data 1051 may include FACEBOOK pages for the local police department, public utilities, the local news channel and other neighborhood level data such as traffic cameras, road closures and other real-time information. This local data 1051 will help the apparatus 1000 respond to a user query with targeted information that will be of concrete interest and use to the user.

Figure 18:
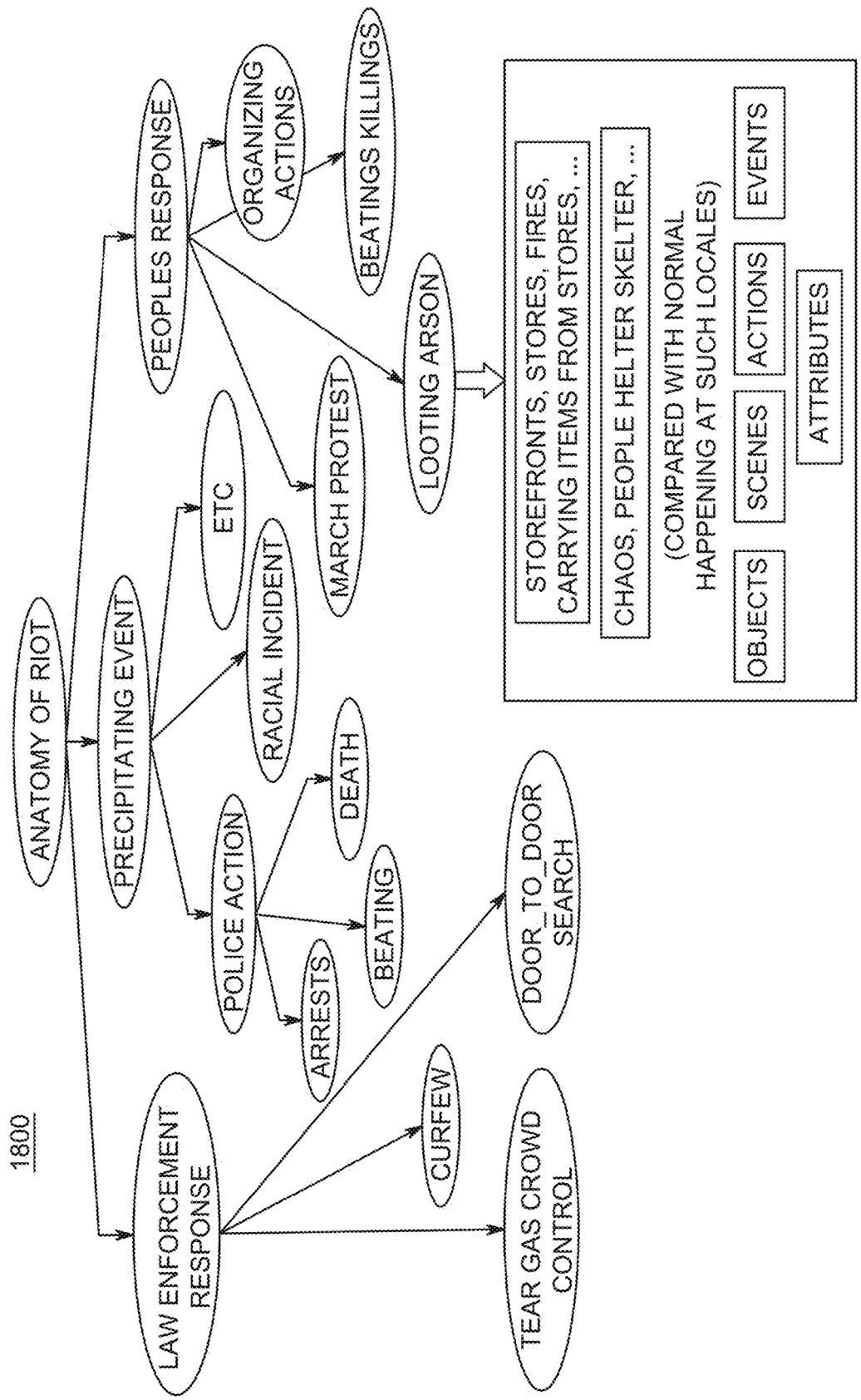
FIG. 18 depicts a functional ontology as generated and used by the apparatus of FIG. 1 in accordance with exemplary embodiments of the present invention.

In one embodiment, the uncertain data 1001 comprises data which indicates an event occurred, but does not contain enough specific information to identify other aspects of the event such as the time, location, those involved, etc. Uncertain data 1001 may comprise video, TWEETS, FACEBOOK posts, or the like. Additionally, the apparatus 1000 may generate or utilize functional ontologies 1003. Functional ontologies 1003 comprise visual graph depictions of attributes of events that occur during, for example, riots, demonstrations, parades, ceremonies and the like. FIG. 18 illustrates an example of a functional ontology 1800. Such an ontology may be built by the apparatus 1000, or be provided to the apparatus 1000. In the context of a riot, the ontology 1800 helps the concept extraction module 1020 extract various concepts associated with the event, such as actions, emotions, affects and the like. Specifically, the functional ontology 1800 enables the apparatus 1000 to extract attributes from observed multimodal data and to infer riot-centric actions based on observed data.

Each of the extraction and indexing module 1002, the alignment module 1004, the resolution module 1006, the textual analytics module 1008 and the multimodal analytics module 1010 can be accessed over the network 101 via input data 1005. According to one embodiment, each of the aforementioned modules are directly accessible via one or more query interfaces where one or more users can enter the input data 1005 as natural language queries. In some embodiments, the input data 1005 comprises a visual search—for example an image is provided and a user wishes to find other images with similar content contained therein. The input data 1005 is processed by the textual analytics module 1008 and semantic information is parsed out of the input data 1005. This semantic information is used to search the multimodal content indexes 1074 to formulate response data 1009 relevant to the user's input data 1005.

The concept extraction module 1020 extracts concepts such as objects/entities 1022, scenes/locations 1024, actions/events 1026 and affect/emotions 1028 from the data contained in data sources 1003, 1001, 1051 and 1053. These concepts are indexed and stored in the multimodal content indexes 1074 to increase searchability. The textual analytics module 1008 couples with the extraction and indexing module 1002 to deliver response data 1009 which is directed towards text-only query analysis. The response data 1009 is a form of actionable data that is, illustratively, textual data that responds to a user based on data extracted by the extraction and indexing module 1002 from textual sources. The concept extraction module 1020 employs methods for extracting complex actions and activities from images or videos described in the commonly assigned, pending U.S. patent application Ser. No. 14/021,696 entitled "Recognizing Entity Interactions in Visual Media" and U.S. application Ser. No. 13/737,607 entitled "Classification, search, and retrieval of complex video events," both of which are herein incorporated by reference in their entirety.

In some instances, the apparatus 1000 does not receive query information and the apparatus 1000 performs analysis continuously while collecting data in order to generate knowledge representation 1055. Knowledge representations 1055 are models of knowledge that the extraction and indexing module 1002 generates in order to demonstrate the interrelatedness of topics, events, objects, scenes, locations, actions, events, emotions and the like to each other. In some embodiments, this model generation can be useful in enhancing the speed of a user query, or the knowledge representations 1055 can be used in manual analysis of an event, such as election polling or determining trending information. The knowledge representations 1055 also provide analytics on textual sources of data, spatial and statistical models and patterns in life such as commercial ship traffic in waterways and political movements. Knowledge representations 1055 can also be used to discern changes in particular sets of information using the alignment module 1004.

The resolution module 1006 operates on the data extracted and indexed by the extraction and indexing module 1002 to generate actionable data 1013 such as response plans to actions/events 1026. The resolution module considers all the objects/entities 1022, the scenes/locations 1024 and the emotions 1028 when determining the actionable data 1013. For example, the layout of an area determines how a vehicle might exit the area quickly when a crowd becomes angry. In some embodiments, the resolution module 1006 determines saliency in media by identifying salient portions within the media such as logos within images, audio, video or the like. Correlating textual descriptions with visual representations and excluding uncorrelated objects and text determine relevant and irrelevant portions as described in commonly assigned, co-pending U.S. patent application Ser. No. 14/452,237, hereby incorporated by reference in its entirety.

The multimodal analytics module 1010 couples with the extraction and indexing module 1002 to deliver response data 1011. The multimodal analytics module 1010 considers many different modes of data including, but not limited to, text, video images, audio and the like. The response data 1011 may include one or more of at least text, images and audio information response to input, such as a user query represented in input data 1005. In some embodiments, the multimodal analytics module 1010 uses complex concept detection with spatio-temporal deep learning, such as a "feature factory" (See, e.g., Fan Yang, Bogdan Matei, Larry S. Davis, Re-ranking by Multi-feature Fusion with Diffusion for Image Retrieval, WACV 2015: 572-579; Chaitanya Desai, Jayan Eledath, Harpreet S. Sawhney, Mayank Bansal, De-correlating CNN Features for Generative Classification. WACV 2015: 428-435; Mohamed R. Amer, Emotion detection in speech using deep networks, ICASSP 2014: 3724-3728; Qian Yu, Jingen Liu, Hui Cheng, Ajay Divakaran, Harpreet S. Sawhney, Semantic pooling for complex event detection, ACM Multimedia 2013: 733-736; Jingen Liu, Qian Yu, Omar Javed, Saad Ali, Amir Tamrakar, Ajay Divakaran, Hui Cheng, Harpreet S. Sawhney, Video event recognition using concept attributes, WACV 2013: 339-346.

The multimodal analytics module 1010 further comprises a sentiment module 1015. The sentiment module 1015 analyzes the extracted and indexed data in the multimodal content indexes 1074 and detects faces, gestures, and the like in order to determine sentiment based on the affect/ emotions 1028. In some embodiments, the affect (e.g., violence, anger) is extracted as described in commonly assigned co-pending U.S. patent application Ser. No. 13/755,775 entitled "Multi-modal modeling of temporal interaction sequences", hereby incorporated by reference in its entirety. Further, the sentiment module 1015 cannot only detect the sentiment displayed in media, but with a feedback path from a user can determine user sentiment in response to media being viewed.

The alignment module 1004 determines whether data collected across the various data sources are aligned with each other and accurately describe an event or an ongoing situation. The alignment module 1004 groups concepts such as objects/entities 1022, scenes/locations 1024, actions/events 1026 and affect/emotions 1028 together, e.g., if they are factually related. For example, a textual description of an event might be linked to an image of the event if the geographic locations associated with the textual description and the image are similar. The alignment module 1004 can also measure the trustworthiness of various news sources, people, or accounts based on multi-modal alignment and an aggregation of the accuracy of media coming from a particular news source. In some instances, the trustworthiness is calculated at least based on geometric reasoning, physics based analysis and anomalies within the media. Further, trustworthiness may be enhanced or decreased if it is determined by the alignment module 1004 that some portions of the media were already found in prior media.

In some embodiments, the alignment module 1004 periodically inspects the multimodal content indexes 1074 and determines discrepancies between different pieces of media describing the same event. For example, a textual description of a protest may clash with an image or video captured of the event. The alignment module 1004 analyzes the objects, scenes, locations, actions, events and emotions extracted by the extraction and indexing module 1002 from the textual description and stored in the multimodal content indexes 1074. The alignment module 1004 then scans for non-textual data that is stored in the multimodal content indexes 1074 and determines the level of alignment and accuracy between these data sources. In some instances, a user can specify through input data 1005 pieces of data that the user would like to determine alignment for. In response, the alignment module 1004 may give a score of alignment, or may suggest that the pieces of data are out of sync, that an image or text are mischaracterized, which data is probably incorrect or the like.

In some embodiments, the apparatus 1000 can perform geo-location on open media (e.g., media available through publicly accessible sources). The concept extraction module 1020 performs geo-localization on open source imagery (e.g., publicly accessible image databases or image sources) using aerial and street level databases of scenes/locations 1024. For example, a location of a burning building or a particular subway outlet can be determined when the open media only states "this burning building" or "this subway outlet". The apparatus 1000 can be coupled with ad-hoc images, audio, text, or the like via satellite links, the Internet and other widely available data sources to aid the concept extraction module 1020 in performing geo-localization. The concept extraction module 1020 can perform geo-location on YOUTUBE videos, TWEETS, FACEBOOK posts, INSTAGRAM pictures, WAZE posts or the like by extracting details from the posts and analyzing them in the context of other open-source data available.

The apparatus 1000 uses, in some instances, ad-hoc sensors to detect, predict and respond to social upheavals, political instability, disasters and the like by extracting and indexing rapidly changing physical and human situations from open domain data sources such as YOUTUBE, TWITTER, FACEBOOK, SMS messages and news feeds. The apparatus 1000 is capable of performing unsupervised discovery of visual topics through large-scale efficient clustering and exploitation of rich collection of multiple features. Textual discovery is performed by the apparatus 1000 through distributional semantics. In one instance, the apparatus 1000 performs change detection based on aerial or satellite images and open media taken over time. The apparatus 1000 is also capable of performing supervised large scale discovery such as large-scale (1,000s to 10,000s) visual and audio concept detection. These concepts are organized for searching and prepared for reasoning and inferencing based on visual and audio concepts.

Figure 11:
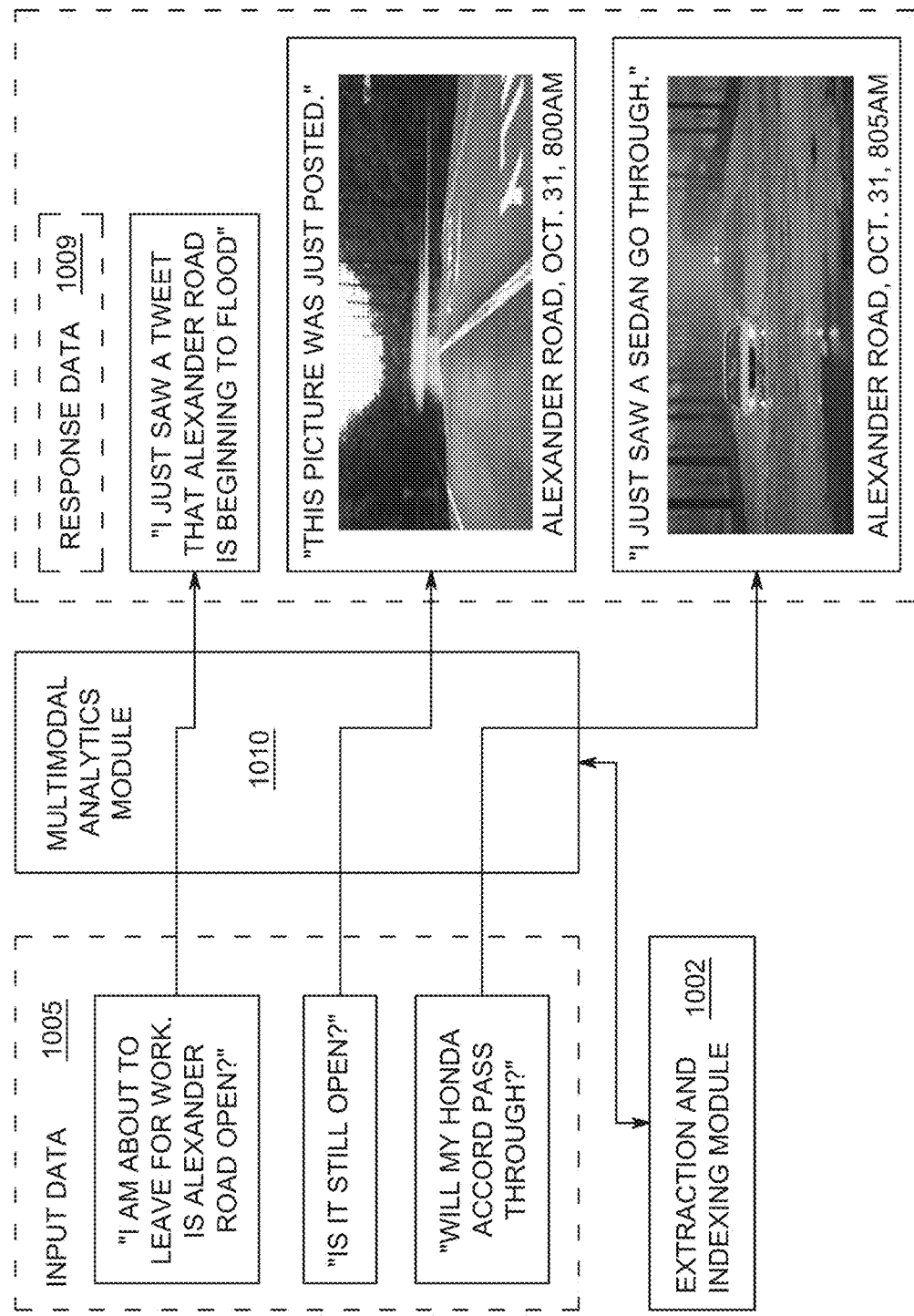
FIG. 11 is a functional block diagram of the multimodal analytics module in accordance with exemplary embodiments of the present invention.
Figure 16:
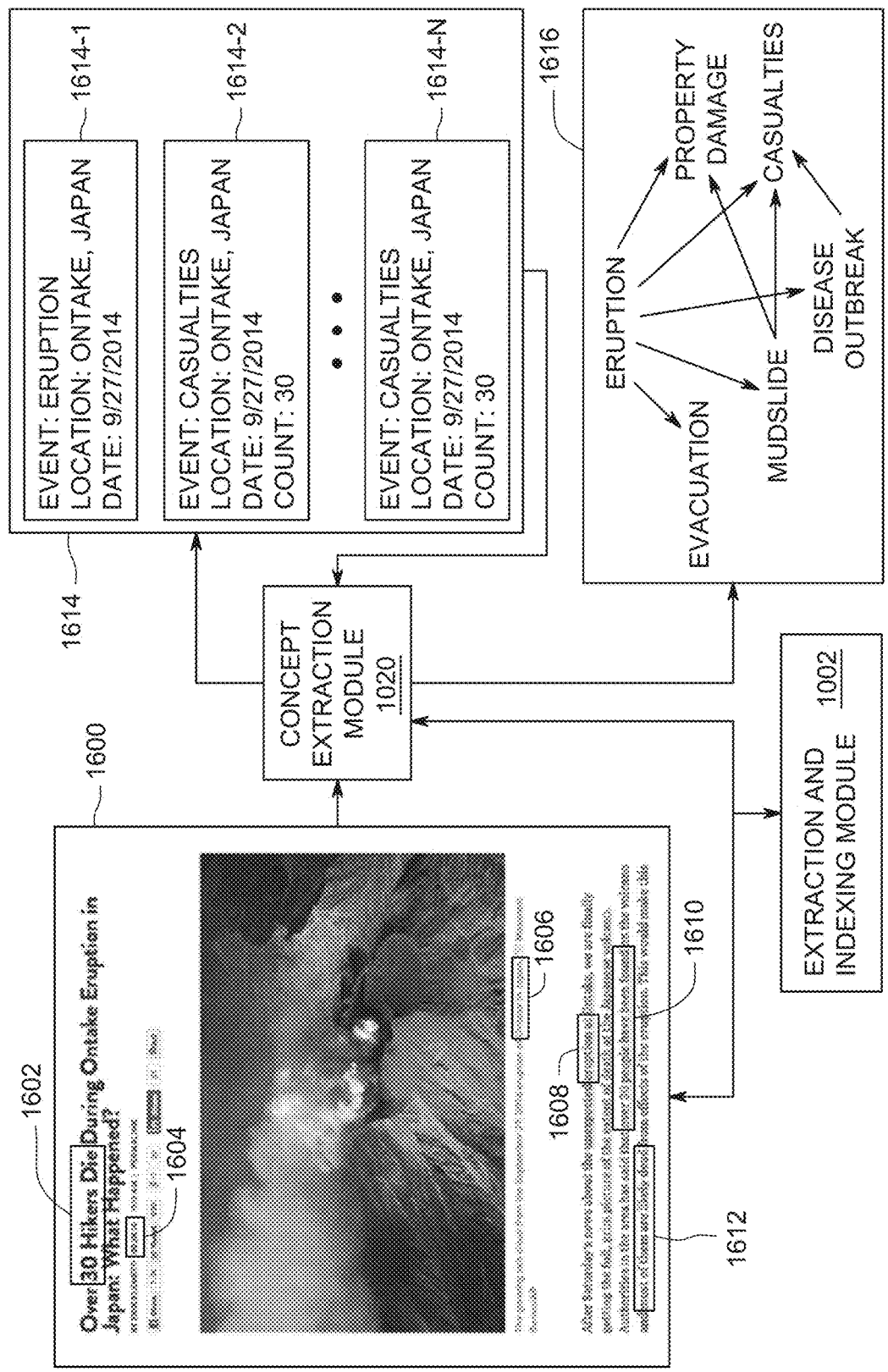
FIG. 16 is a functional diagram of the concept extraction module in accordance with exemplary embodiments of the present invention.
Figure 17:
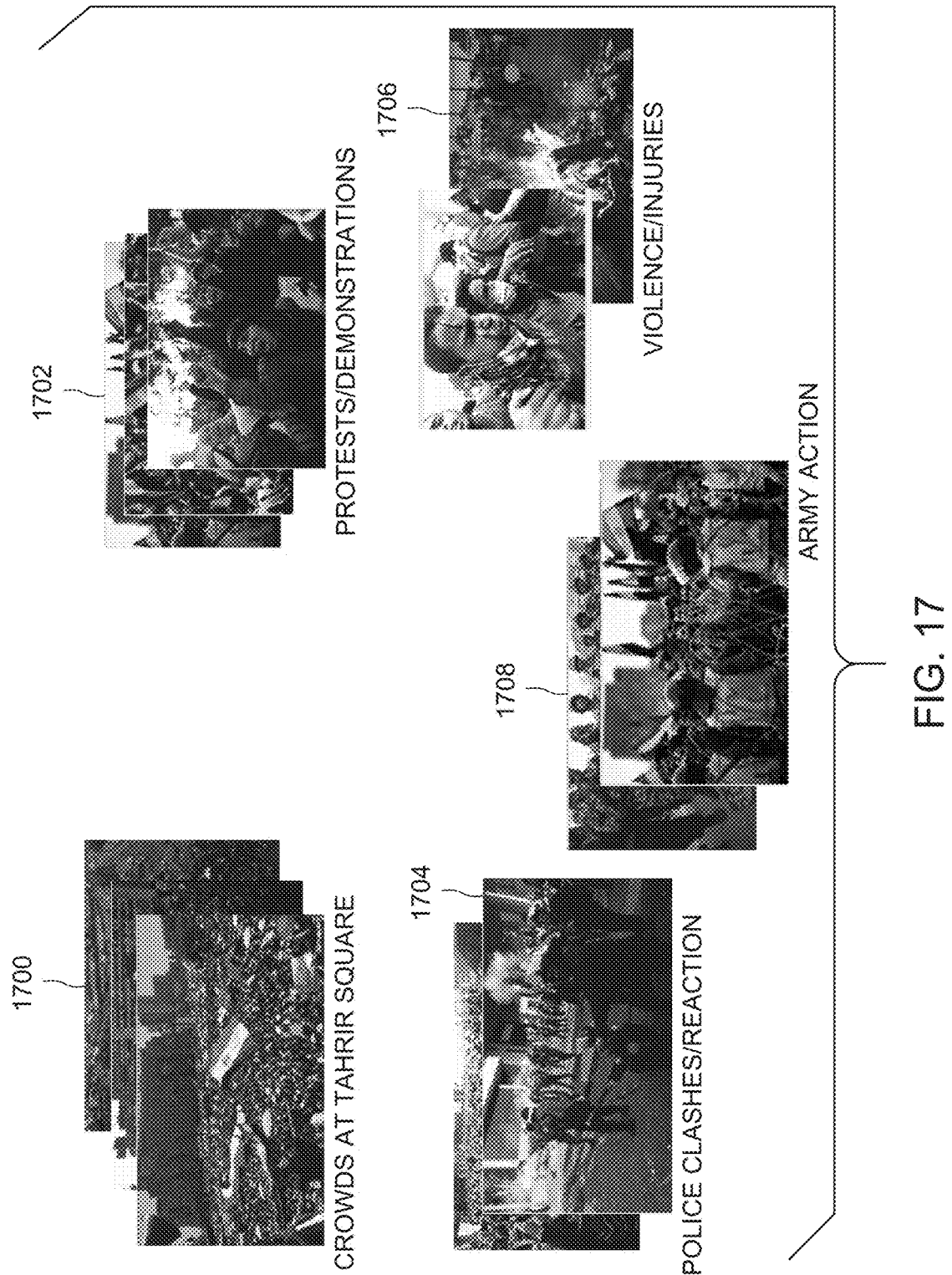
FIG. 17 depicts illustrations of the various visual topics that apparatus discovers through traversing clustered open media sources.

FIG. 11 is a functional block diagram of the multimodal analytics module in accordance with exemplary embodiments of the present invention. FIG. 11 illustrates one example of how a user's input data 1005 is processed and responded to as response data 1009. In one embodiment, the input data includes user queries and/or any explicit/implicit indication that there is a need to provide the user with more pertinent information for effective decision making. Thus, a specific query initiated by the user is not required. In some examples, such indications could include a social media post by the user (e.g., FIG. 13), or a message to a friend related to the user's concern (FIG. 12 and FIG. 14), e.g., road closures and the like. The apparatus 1000 can extract or discern the input related to a user's navigation/situational awareness of a physical environment via social media posts, location and other data, and can provide newly pertinent information for effective decision making by extracting and correlating concepts as shown in FIG. 16-18.

In some embodiments, the apparatus 1000 is designed to provide current or real-time vehicle related assistance, such as situation avoidance assistance, which can help the vehicle driver navigate around difficult traffic or weather situations. In one example, the input data 1005 includes a first question by a user asking "I am about to leave work. Is Alexander Road open?" The input data 1005 also includes information regarding a user's location, available through the user's mobile phone or vehicle GPS signal, Wi-Fi signal, and knowledge of the user's home address. The multimodal analytics module 1010 couples with the extraction and indexing module 1002 accesses the extraction and indexing module 1002 to determine, via semantic and feature indexing, if there is local data available for the user's neighborhood and for the location of the area in question. This is described further in method 1900 and 2000 illustrated in FIGS. 19-20. In some instances, the location of Alexander Road is inferred based on the location of the user's home, the user's current location or a location of the user's destination.

After reviewing the data accessed in the extraction and indexing module, the multimodal analytics module 1010 responds with "I just saw a tweet that Alexander Rd. is beginning to flood" via informal gleaned from indexed data. A user can continue to have a conversation with the apparatus 1000 by asking "Is it still open?" The multimodal analytics module 1010 performs a search for data relevant to the query and responds with pictures that were posted to social media sites related to Alexander Road and in some embodiments a time/date of the picture indicating that "This picture was just posted." In some cases, the module 1010 determines that the retrieved picture is relevant to the current event/query based at least in part on automated image analysis (e.g., object/entity extraction). Finally, the user may end the conversation by asking "Will my HONDA ACCORD pass through?" The multimodal analytics module 1010 once again accesses the extraction and indexing module 1002 to determine if there are any indexes stored on vehicles and Alexander road, and may further determine whether the type of vehicle that the user has indicated has been seen driving through Alexander Road. The multimodal analytics module 1010 responds by saying "I just saw a sedan go through," and the system's verbal response may be accompanied by a picture of a similar automobile as the user described (e.g., Honda Accord) driving through the named road. If the multimodal analytics module 1010 did not have or was unable to locate, using the above-described techniques, an image of the sedan previously going through the named road, the multimodal analytics module 1010 may perform probabilistic comparisons and determine if the extraction and indexing module 1002 contains images, text or video about similarly sized roads and automobiles, or how such automobiles have navigated similarly flooded roads in the past.

In some embodiments, in additional to the context of vehicle navigation, the apparatus 1000 provides pertinent information in response to natural disasters, man-created disasters such as terrorism, fires, demolitions, riots and the like. The apparatus 1000 also provides pertinent responsive information based on input related to many other types of events for which the user may desire actionable information, including political events such as elections and debates or cultural fashion trends.

According to exemplary embodiments, the apparatus 1000 operates in multiple modes. In one mode, the apparatus 1000 always assimilates, corroborates and correlates information across the unsynchronized and/or disparate data sources (e.g., sensors). In another mode, the apparatus 1000 is responsive to questions or general user-related input such as social media posts and the like. In yet another more, the apparatus 1000 follows data portals and provides salient and important or trending information related to the portal. In yet another mode, the apparatus 1000 creates statistics related to input, queries, responses and alignment of the unsynchronized data sources for post-hoc analysis in order to correct or improve the processes of apparatus 1000.

Figure 12:
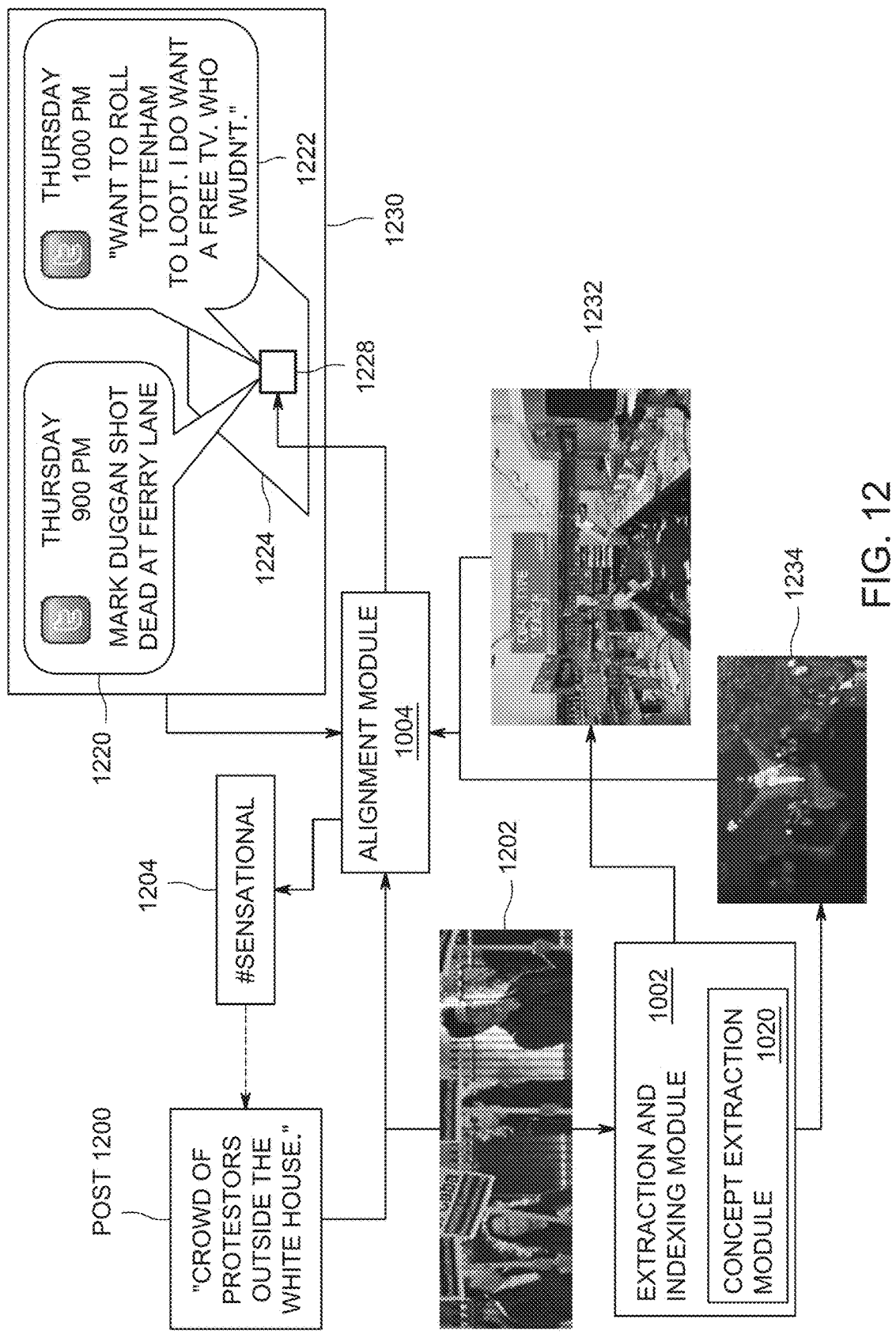
FIG. 12 is a functional block diagram of the operation of alignment module in accordance with exemplary embodiments of the present invention.

FIG. 12 is a functional block diagram of the operation of alignment module 1004 in accordance with exemplary embodiments of the present invention. The alignment module 1004 may operate in the background or may actively respond to user queries regarding accuracy in media. In FIG. 12, an example of background monitoring is illustrated. The alignment module 1004 reviews a post 1200 on a social media site such as FACEBOOK, TWITTER, or the like that states "Crowd of protestors outside the White House." In this embodiment, the alignment module 1004 accesses the extraction and indexing module 1002 and looks for similarly timed images or videos at or around the White House and retrieves image 1202.

Another example illustrated in FIG. 12 is information regarding the 2012 Tottenham riots. Some information 1230, which comprises a first TWEET 1220 written at 9:00 pm Thursday indicates "Mark Duggan shot dead at Ferry Lane". Another TWEET 1222 posted at Thursday at 10:00 pm states "Want to roll Tottenham to loot. I do want a free TV. Who wudn't (sic)". The location of these tweets is geolocated by the concept extraction module 1020 on map 1224. The alignment module 1004 then accesses the extraction and indexing module 1002 to receive corroborating images of a riot at location 1228, updated on map 1224. The extraction and indexing module 1002 produces image 1232 and 1234 to corroborate that in fact riots are taking place at Tottenham in London.

The concept extraction module 1020 determines physical characteristics of the event, constituent elements of importance, higher levels of semantic interpretation and the like. For example, physical characteristics include where and when the riots started, what locales the riots progressed through, and the timeline of salient events as the riots progressed. Constituent elements of importance include which stores were looted and how badly they were looted, the size of the crowd and leaders of the riot. Higher-level semantic interpretation includes determining whether the crown was associated towards a particular political ideology, determining emotional and ideological leaders in the crowd and determining neighborhood affinities towards the riots. Those of ordinary skill in the art will recognize that these are just a few examples of the type of events and concepts the apparatus 1000 and the concept extraction module 1020 can provide. The description of events is used as unstructured knowledge by the concept extraction module 1020 for learning events with multimodal data.

The image 1202 is analyzed by the alignment module 1004 which determines that there is no "crowd", but merely a few people who have gathered outside of the White House. The alignment module 1004 then assigns a tag 1204 to the post 1200 indicating that it is "#sensational". In some embodiments, the alignment module 1004 is able to automatically post such determinations to social media applications and websites and automatically tag posts with one or more descriptors, or "tags", describing the accuracy of the contents of the post.

Figure 13:
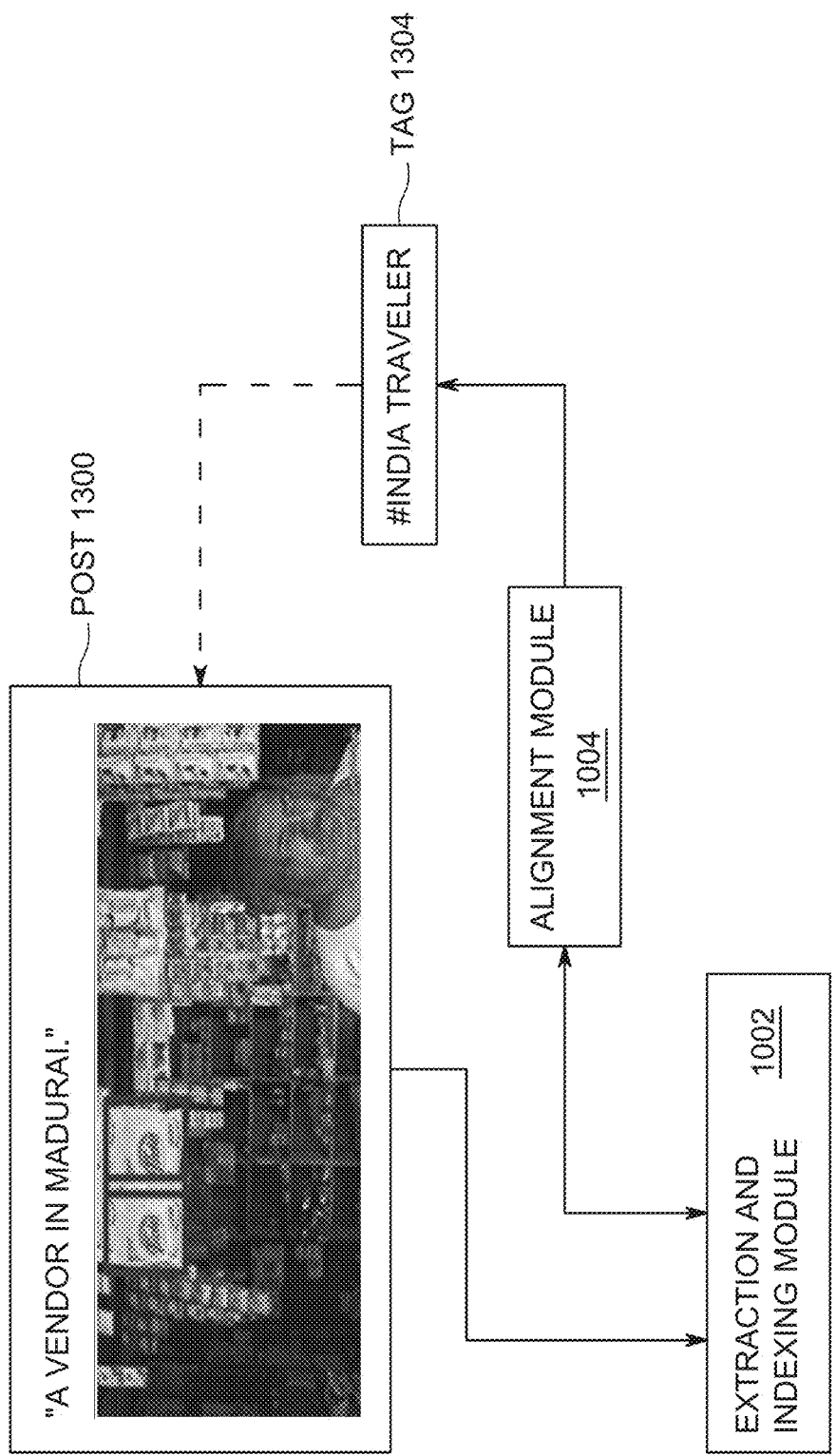
FIG. 13 is another functional block diagram of the operation of alignment module in accordance with exemplary embodiments of the present invention.

FIG. 13 is another functional block diagram of the operation of alignment module 1004 in accordance with exemplary embodiments of the present invention. A multimodal post 1300 stating "A vendor in Madurai" along with a picture of the vendor is posted on a social media site. The post 1300 is indexed and objects, entities, locations, and the like are extracted and correlated and stored by the extraction and indexing module 1002. The alignment module 1004 accesses the extraction and indexing module 1002 and performs alignment on the post 1300 and determines that an appropriate descriptor, or "tag", might be the "#Indiatraveler" tag 1304. Social media applications and websites and their users can enable the alignment module 1004 of the apparatus 1000 to perform such auto-correction, auto-tagging or the like on their posts or on posts displayed to them.

Figure 14:
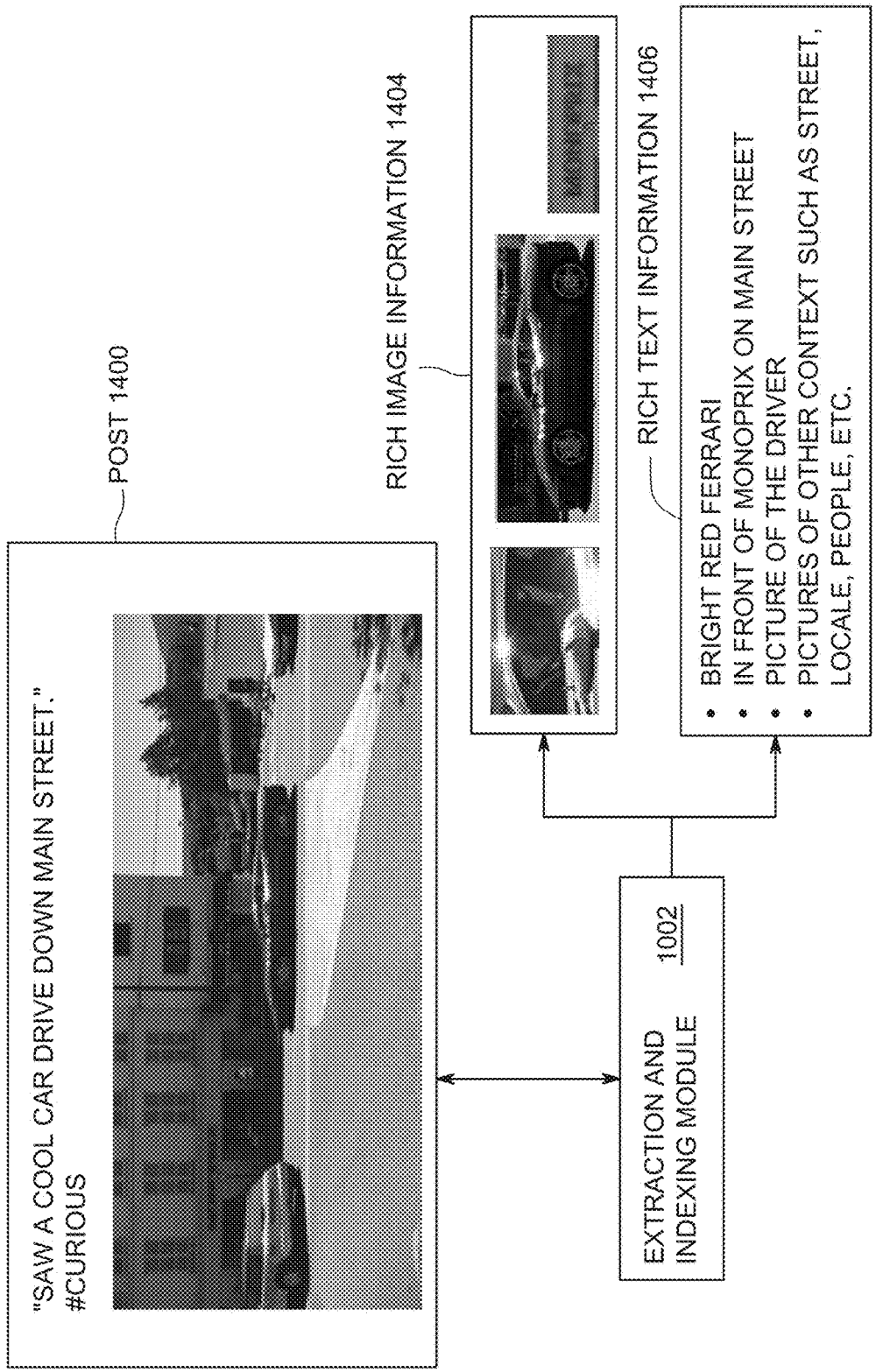
FIG. 14 is a functional block diagram of the operation of the extraction and indexing module in accordance with exemplary embodiments of the present invention.

FIG. 14 is a functional block diagram of the operation of the extraction and indexing module in accordance with exemplary embodiments of the present invention. A social media post 1400 comprises a textual portion that states "Saw a cool car drive down Main Street." and an image portion showing a picture of the automobile in the street. The extraction and indexing module 1002 breaks down the post 1400 into rich image information 1404 which comprises analyzing portions of the image for detectable objects, entities, locations and the like, such as the driver of the vehicle, a description of the vehicle, nearby landmarks and the like. Further, the extraction and indexing module 1202 generates rich text information 1406 associated with the post 1400. The rich text information 1406 describes the image: "Bright red Ferrari, in front of MONOPRIX on Main Street, Picture of the Driver, Picture of other context such as street, locale, people, etc."

Figure 15:
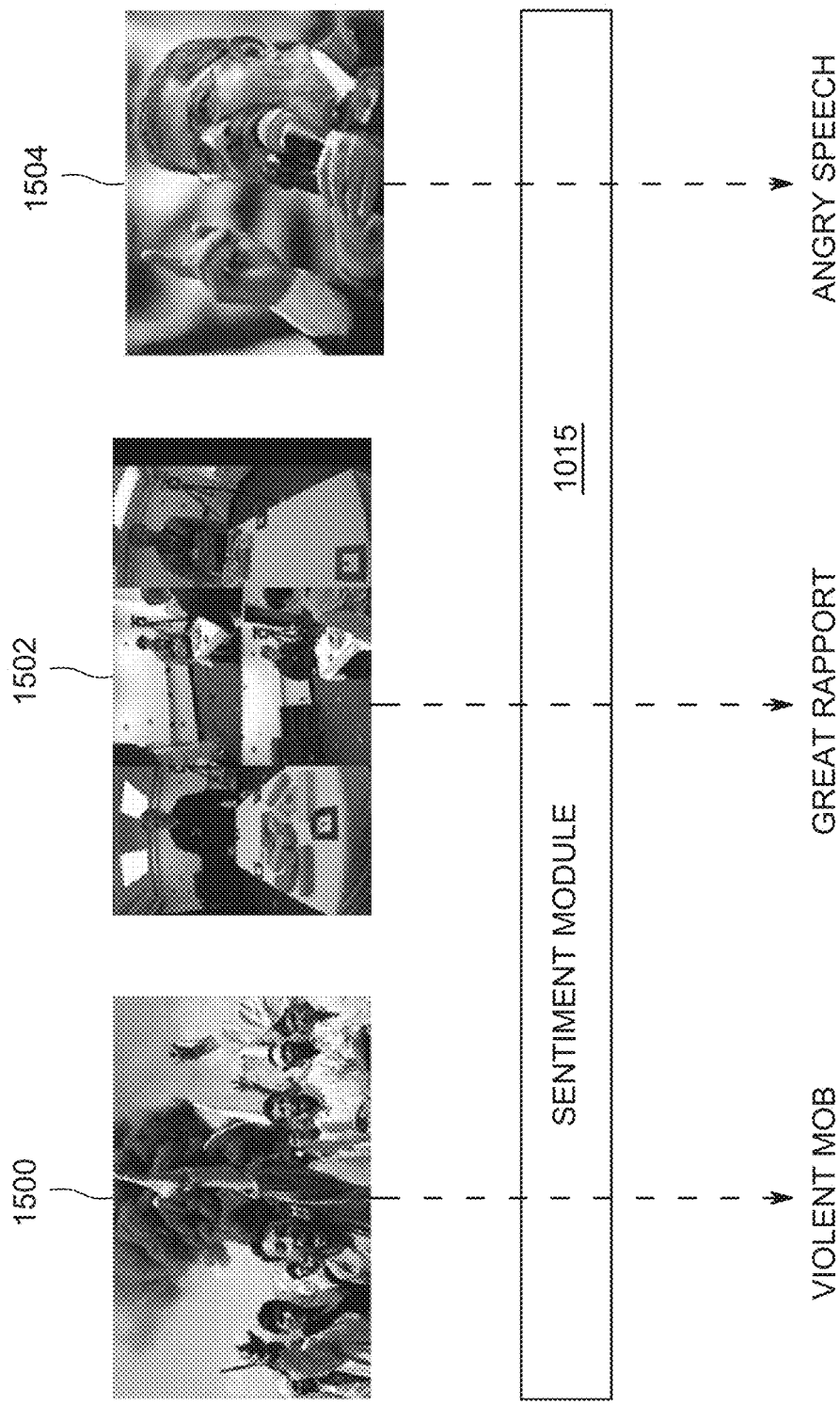
FIG. 15 is a functional block diagram of the operation of the sentiment module in accordance with exemplary embodiments of the present invention.

FIG. 15 is a functional block diagram of the operation of the sentiment module in accordance with exemplary embodiments of the present invention. In one example, the apparatus 1000 analyzes the images 1500, 1502 and 1504, extracts objects, entities, locations, actions, emotions and more from the images and indexes each of the extracted attributes along with the images in the multimodal content indexes 1074. The sentiment module 1015, a portion of the multimodal analytics module 1010, operates in one embodiment as a background process and scans the various attributes of the indexed images and determines one or more associated sentiments. For example, the sentiment module 1015 determines that the sentiment in image 1500 is violent and a mob is involved based on the extracted objects within the image. Image 1500 is determined to depict a great rapport on a team and image 1504 is determined to depict someone engaged in angry speech. In some instances, the sentiment module 1015 will associate "angry speech" and the orator to create a connection so that statistical analysis can be performed thereupon. The connection is stored in database 1090.

FIG. 16 is a functional diagram of the concept extraction module 1020 in accordance with exemplary embodiments of the present invention. The concept extraction module 1020 generates Actions/events 1026 by scanning news articles. For example, the concept extraction module 1020 of the apparatus 1000 receives and scans an article 1600 regarding the death of hikers in Japan from the extraction and indexing module 1002. The headline may indicate the number of hikers killed, a first data point 1602, the location of the accident, second data point 1606, and what time the article was posted, third data point 1604. The article text may contain the cause of the accident, fourth data point 1608, the number of casualties, a fifth data point 1610, in addition to the probability of their death, the sixth data point 1612.

The concept extraction module 1020 extracts the event, the location, the date, the count of dead and the like as event information 1614. The event information 1614 may contain multiple models of descriptions of the event, e.g., 1614-1, 1614-2 to 1614-N. Each of these models may contain different descriptive information. In one embodiment, joint semantic-statistical modeling and inference, including hybrid models, classification loss and representation loss (binary/triplet), are employed to generate the models. The concept extraction module 1020 then analyzes the event information 1614 and generates an understanding 1616 of the event describing the causal nature of what has happened and what may happen. For example, in the understanding 1616, an eruption is determined to cause at least, an evacuation, a mudslide, disease outbreak, casualties and property damage. The mudslide may also cause property damage and casualties, while the disease outbreak may also cause casualties. Each of these causal connections are preserved in the understanding 1616 and presented in response to a query or a real-time event monitoring system.

FIG. 17 depicts illustrations of the various visual topics that apparatus 1000 discovers through traversing clustered open media sources. Apparatus 1000 determines that image set 1700 depicts crowds at Tahrir Square. The apparatus 1000 can further establish that images 1702 all depict protest and demonstrated related actions. In image 1704, police clashes and reactions are extracted as scene concepts by the concept extraction module 1020, while in images 1706 violence and injuries are extracted and in image 1708 army actions are extracted.

Figure 19:
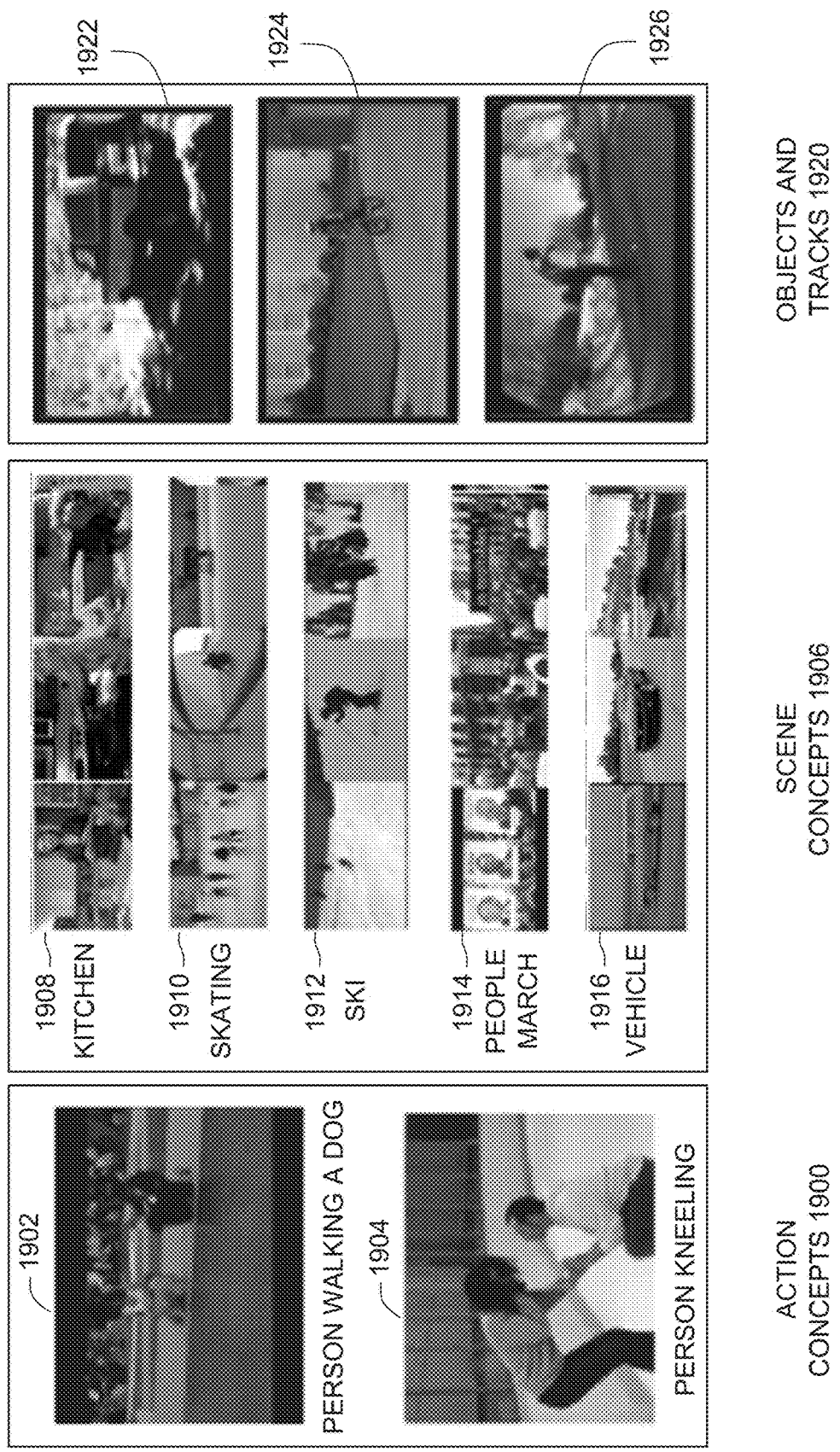
FIG. 19 depicts several examples of visual concepts extracted by the concept extraction module of FIG. 1 in accordance with exemplary embodiments of the present invention.

FIG. 19 depicts several examples of visual concepts extracted by the concept extraction module 1020 of FIG. 1 in accordance with exemplary embodiments of the present invention. For example, the concept extraction module 1020 extracts action concepts 1900 such as "Person walking a Dog" and "Person Kneeling" from images 1902 and 1904 respectively.

As shown in FIG. 19, the concept extraction module 1020 can also identify scene concepts, i.e., themes relating several images or themes explored in a video clip. For example, the scene concepts 1906 include "Kitchen" for images 1908 which take place in a kitchen, "Skating" for images 1910 depicting a skating rink or showing skating activity, "Ski" for images 1912 depicting skiing, "People March" for images 1914 that depict protest marches and gathered crowds and "Vehicle" for images 1916 depicting several automobiles. Further, the concept extraction module 1020 can extract objects and tracks 1920. Objects and track 1920 include the tracks of a moving vehicle in image 1922, a bicycle and its movement in image 1924 and a skater and his or her movements depicted in image 1926.

Figure 20:
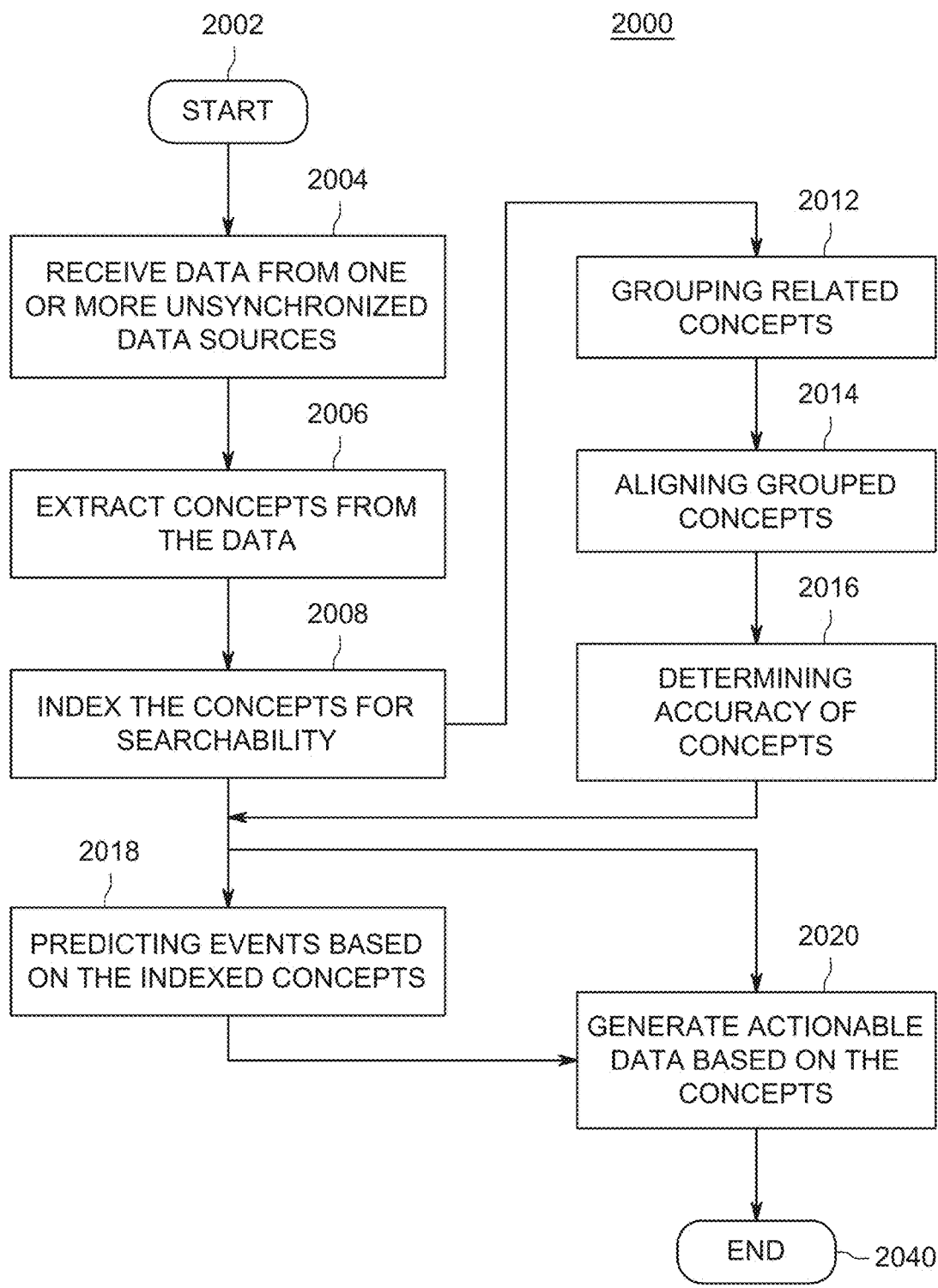
FIG. 20 depicts a flow diagram for a method for generating actionable data in accordance with exemplary embodiments of the present invention.

FIG. 20 depicts a flow diagram for a method 2000 for generating actionable data in accordance with exemplary embodiments of the present invention. The method 2000 is an exemplary implementation of the function of the apparatus 1000 as a software module executed by the computer system 400 shown in FIG. 4.

The method 2000 begins at step 2002 and proceeds to step 2004 where data is received or collected from one or more unsynchronized data sources. According to FIG. 1, these one or more data sources may comprise background data sources, uncertain data, local data and functional ontologies.

At step 2006, concepts represented in the data are extracted by the concept extraction module 1020. In exemplary embodiments, concepts comprise objects, entities, actions, events, emotions, affects and themes found in the data. These concepts are then indexed at step 2008 by the apparatus 1002 and stored in a database.

At step 2012, as part of indexing the concepts for searchability, related concepts are grouped together and then aligned at step 2014. Alignment in this embodiment comprises comparing the various concepts extracted from the one or more unsynchronized data sources and determining how the concepts match against each other. At step 2016, the accuracy of various related concepts are determined, establishing a trustworthiness level to the one or more data sources from which the concepts were extracted.

The method then proceeds to step 2018, where events are predicted based on the indexed concepts. According to one embodiment, the apparatus 1000, implemented as a software module, uses a set of rules to classify related concepts. The classification helps in inferring and predicting what may happen next based on the related concepts. For example, if a small crowd is initially gathered in an area, and other data sources report at a later time that the crowd has grown, the apparatus 1000 predicts the growth of the crowd or possible routes that the crowd might take based on patterns in the concepts that have been recognized. Based on a similar analysis, at step 2020 actionable data is generated based on the indexed concepts. An example of actionable data may include a plan for police response, a strategy for news coverage or suggestion of possible road closures to minimize impact on traffic. The method ends at step 2040.

Figure 21:
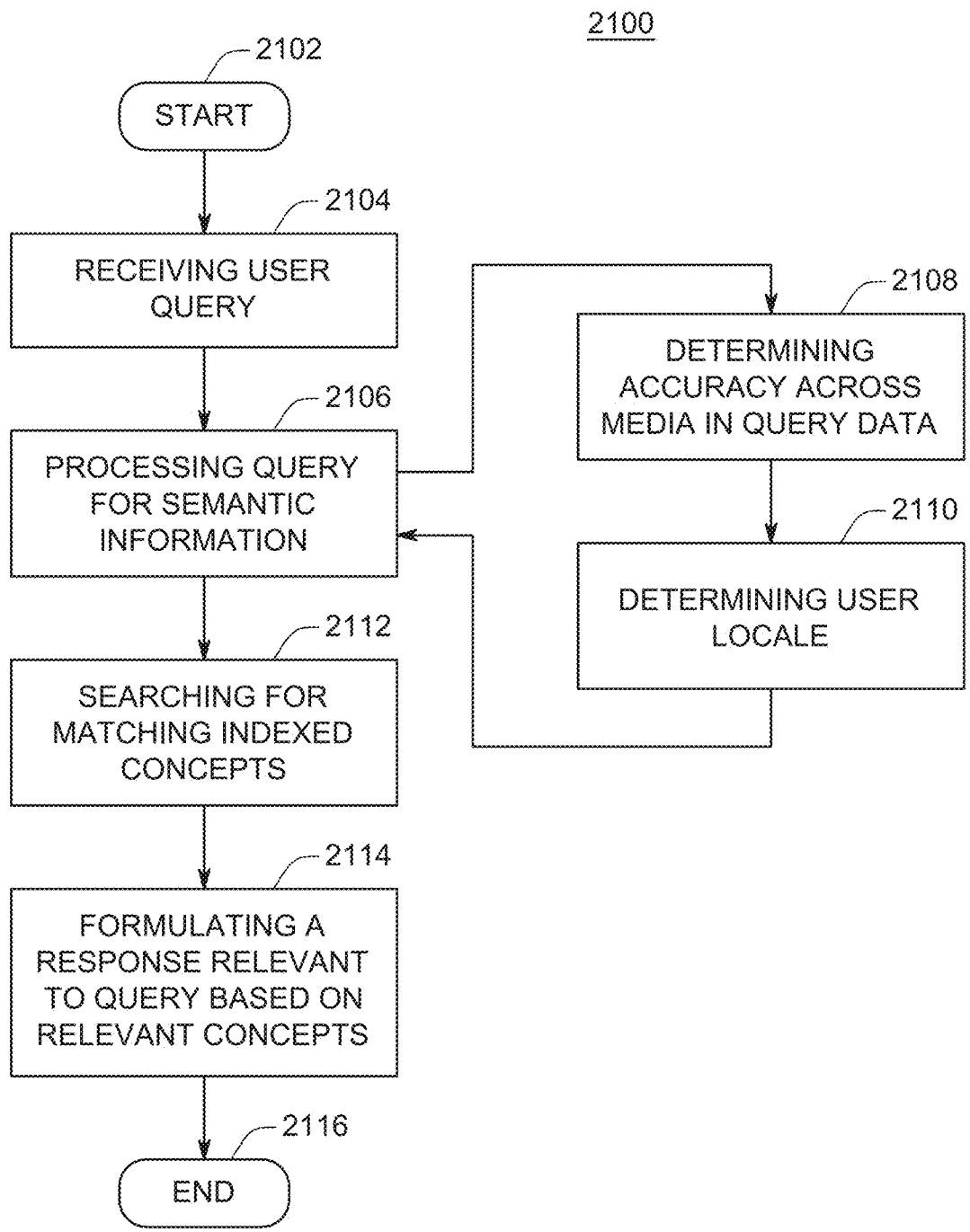
FIG. 21 depicts a flow diagram for a method for processing a query in view of indexed concepts in accordance with exemplary embodiments of the present invention.

FIG. 21 depicts a flow diagram for a method 2100 for processing a query in view of indexed concepts in accordance with exemplary embodiments of the present invention. The method 2100 is another exemplary implementation of the function of a portion the apparatus 1000 as a software module executed by the computer system 400 shown in FIG. 4.

The method 2100 begins at step 2102 and proceeds to step 2104 where query data is received from a query user interface. The user interface can take any form such as a mobile application, a web interface, a textual interface, a voice interface, or a combination thereof. At step 2106, the query data is processed to extract semantic information. For example, important textual content such as time, date, location, names, and the like are extracted from the query data. This semantic information represents the most relevant content of the query data organized in a systematic fashion. In some embodiments, the query data may include a question regarding road conditions as shown in FIG. 11. In other embodiments, the query data may include multimodal data sources that the user wishes to have verified.

At step 2108, accuracy across the multimodal media is determined by the alignment module 1004 shown in FIG. 1. In some instances, the apparatus 1000 may also determine a user's locale based on the query data. In other embodiments, locale information is provided to the apparatus 1000.

At step 2112, the apparatus 1000 searches for matching indexed concepts that are relevant to the semantic information in the query data. For example, if the semantic information relates to local roads around the user, the apparatus 1000 will search for concepts that are extracted from data in the locale of the user including, but not limited to, local traffic, local news, tweets, social media posts and WAZE tags that are determined to be local to the user. At step 2114, the multimodal analytics module 1010 shown in FIG. 1 formulates a response relevant to the query based on the relevant concepts found. For example, if the query included a question asking about road conditions as shown in FIG. 11, the response includes text, image and other data found from concepts extracted from the unsynchronized data sources depicting the road the user would like to take, and whether the user's vehicle would be able to navigate the road. The method terminates at step 2110.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A method for generating data to provide situational awareness or decision-making assistance to a user in relation to a physical environment, the method comprising, with a computer system:
processing input data comprising at least data associated with the physical environment; and
when a need for situational awareness or decision-making assistance is detected based on the input data, generating response data, the response data derived from multimodal data from a plurality of electronic data streams comprising audio, visual and textual information, the data streams received from a plurality of data sources, wherein generating the response data comprises:
determining a characteristic of the need for situational awareness or decision-making assistance;
extracting semantic information from the audio, visual and textual information;
correlating the extracted semantic information in accordance with the characteristic;
selecting a subset of the audio, visual and textual information based on the correlation of the extracted semantic information with the characteristic; and
outputting at least a portion of the selected subset as the response data.

2. The method of claim 1, comprising receiving at least some of the input data from a sensor of a vehicle.

3. The method of claim 2, wherein the input data comprises an inquiry relating to navigation of the physical environment.

4. The method of claim 1, wherein the multimodal data comprises at least two of: image, audio, video and textual data.

5. The method of claim 1, comprising generating a route by which the user may navigate the physical environment.

6. The method of claim 1, comprising generating data indicative of one or more obstacles in a route by which the user may navigate the physical environment.

7. The method of claim 1, comprising extracting affect information from one or more of the audio, visual and textual information.

8. The method of claim 7, further comprising inferring a context from one or more of the audio, visual, and textual information.

9. The method of claim 1, wherein the input comprises data indicative of a location or a direction of movement.

10. The method of claim 1, wherein the input comprises a natural language query.

11. The method of claim 1, comprising:
extracting one or more concepts from the audio, visual and textual information, the one or more concepts comprising at least one of objects, actions, scenes and emotions;
indexing the extracted concepts; and
generating the response data using the indexed concepts.

12. The method of claim 1, comprising creating the subset of the audio, visual and textual information at least partly by performing a gating technique.

13. The method of claim 1, comprising:
receiving a natural language query;
extracting semantic information from the natural language query;
searching the correlated information using at least some of the semantic information extracted from the natural language query; and
formulating the response data based on a result of the searching.

14. The method of claim 1, comprising:
extracting concepts from the audio, visual and textual information, the extracted concepts comprising at least one of objects, actions, scenes and emotions;
grouping the concepts based on relationships of the concepts to particular events;
aligning related concepts within the groups of concepts; and
generating a measure of accuracy of the groups of concepts based on the aligning.

15. The method of claim 14, further comprising:

retrieving the audio, visual and textual information from unsynchronized data sources; and generating a measure of a trustworthiness of the unsynchronized data sources based on the unsynchronized data sources.

16. A method for generating informational assistance for a user in relation to a physical environment, the method comprising, with a computer system:

processing input data to identify a need for informational assistance relating to the physical environment;

determining a characteristic of the physical environment, in addition to a geographical location, associated with the need for informational assistance;

extracting semantic information from a plurality of electronic data streams comprising audio, visual and textual information, the data streams received from a plurality of data sources;

correlating the extracted semantic information with the characteristic and the geographical location;

selecting a subset of the audio, visual and textual information based on the correlation of the extracted semantic information with the physical characteristic and the geographical location;

generating the informational assistance comprising at least a portion of the selected subset; and outputting the informational assistance to the user.

17. The method of claim 16, comprising temporally aligning at least two of the audio, visual, and textual information of the informational assistance in the output to the user.

18. The method of claim 16, comprising geo-spatially aligning at least two of the audio, visual, and textual information of the informational assistance in the output to the user.

19. The method of claim 16, comprising semantically aligning at least two of the audio, visual, and textual information of the informational assistance in the output to the user.

20. The method of claim 16, comprising generating natural language text output based on at least a portion of the selected subset of audio, visual, and textual information.

* * * * *